(12) United States Patent
Ladwig et al.

(10) Patent No.: US 11,782,286 B2
(45) Date of Patent: Oct. 10, 2023

(54) SHAPE MEMORY ALLOY WIRE ATTACHMENT STRUCTURES FOR A SUSPENSION ASSEMBLY

(71) Applicant: HUTCHINSON TECHNOLOGY INCORPORATED, Hutchinson, MN (US)

(72) Inventors: Peter F. Ladwig, Hutchinson, MN (US); Mark A. Miller, Hutchinson, MN (US); Michael W. Davis, Rockford, MN (US); Bryan J. Scheele, Hutchinson, MN (US); Douglas P. Riemer, Waconia, MN (US); Donald M. Anderson, Hutchinson, MN (US); John A. Theget, Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 9 days.

(21) Appl. No.: 15/063,151

(22) Filed: Mar. 7, 2016

(65) Prior Publication Data
US 2016/0258425 A1 Sep. 8, 2016

Related U.S. Application Data

(60) Provisional application No. 62/129,562, filed on Mar. 6, 2015.

(51) Int. Cl.
*G02B 27/64* (2006.01)
*F03G 7/06* (2006.01)
(Continued)

(52) U.S. Cl.
CPC .......... *G02B 27/646* (2013.01); *F03G 7/065* (2013.01); *G02B 7/023* (2013.01); *G02B 7/08* (2013.01); *G02B 7/09* (2013.01)

(58) Field of Classification Search
CPC . G02B 7/02; G02B 7/023; G02B 7/09; G02B 7/04; G02B 27/646; F03G 7/065; H01R 4/188
See application file for complete search history.

(56) References Cited

U.S. PATENT DOCUMENTS 3,587,432 A 6/1971 Koch
3,734,386 A 5/1973 Hazel
(Continued)

FOREIGN PATENT DOCUMENTS

CN 1764239 A 4/2006
CN 1914555 A 2/2007
(Continued)

OTHER PUBLICATIONS

International Preliminary Report on Patentability in International Application No. PCT/US2015/062576, dated Jun. 15, 2017.
(Continued)

*Primary Examiner* — Ephrem Z Mebrahtu
(74) *Attorney, Agent, or Firm* — DLA Piper LLP (US)

(57) ABSTRACT

Embodiments of the disclosure include a suspension assembly having a support member, a moving member movably coupled to the support member, and shape metal alloy wires coupled between the support and moving members by attachment structures. In embodiments, the attachment structures include a first portion and a second portion configured to be crimped together. In embodiments, at least one of the first and second portions include an etched recess.

77 Claims, 31 Drawing Sheets

(51) Int. Cl.
    *G02B 7/09*         (2021.01)
    *G02B 7/02*         (2021.01)
    *G02B 7/08*         (2021.01)

(56) References Cited

U.S. PATENT DOCUMENTS

| | | |
|---|---|---|
| 3,776,447 A | 12/1973 | Simmons et al. |
| 4,140,265 A | 2/1979 | Morino |
| 4,437,603 A | 3/1984 | Kobayashi et al. |
| 4,781,319 A | 11/1988 | Deubzer et al. |
| 4,984,581 A | 1/1991 | Stice |
| 5,269,810 A | 12/1993 | Hull et al. |
| 5,477,463 A | 12/1995 | Tamura |
| 5,513,917 A | 5/1996 | Ide et al. |
| 5,831,820 A | 11/1998 | Huang |
| 5,840,417 A | 11/1998 | Bolger |
| 6,056,605 A * | 5/2000 | Nguyen .................. H01R 4/188 439/877 |
| 6,149,742 A | 11/2000 | Carpenter et al. |
| 6,279,215 B1 | 8/2001 | Nomoto |
| 6,916,115 B1 | 7/2005 | Vallance et al. |
| 7,384,531 B1 | 6/2008 | Peltoma et al. |
| 7,388,733 B2 | 6/2008 | Swanson et al. |
| 7,679,647 B2 | 3/2010 | Stavely et al. |
| 7,929,252 B1 | 4/2011 | Hentges et al. |
| 8,144,430 B2 | 3/2012 | Hentges et al. |
| 8,169,746 B1 | 5/2012 | Rice et al. |
| 8,175,449 B2 | 5/2012 | Kubo et al. |
| 8,218,958 B2 | 7/2012 | Sato |
| 8,350,959 B2 | 1/2013 | Topliss et al. |
| 8,388,773 B2 | 3/2013 | Luntz et al. |
| 8,421,908 B2 | 4/2013 | Kosaka et al. |
| 8,570,384 B2 | 10/2013 | Brown |
| 8,602,665 B2 | 12/2013 | Kamatani et al. |
| 8,848,064 B2 | 9/2014 | Topliss et al. |
| 8,885,299 B1 | 11/2014 | Bennin et al. |
| 9,175,671 B2 | 11/2015 | Howarth |
| 9,366,879 B1 | 6/2016 | Miller |
| 9,454,016 B1 | 9/2016 | Ladwig et al. |
| 9,479,699 B2 | 10/2016 | Brown et al. |
| 9,541,769 B2 | 1/2017 | Ladwig et al. |
| 10,036,897 B2 | 7/2018 | Ladwig et al. |
| 10,067,357 B2 | 9/2018 | Ladwig et al. |
| 10,139,647 B2 | 11/2018 | Miller |
| 10,670,878 B2 | 6/2020 | Miller et al. |
| 10,775,638 B2 | 9/2020 | Miller et al. |
| 10,969,602 B2 | 4/2021 | Ladwig et al. |
| 11,073,702 B2 | 7/2021 | Miller |
| 11,409,070 B2 | 8/2022 | Scheele et al. |
| 11,635,631 B2 | 4/2023 | Ladwig et al. |
| 2004/0036479 A1 | 2/2004 | Thomsen |
| 2004/0093610 A1 | 5/2004 | Suzuki et al. |
| 2005/0115235 A1 | 6/2005 | Mernoe |
| 2005/0190683 A1 | 9/2005 | Ando |
| 2008/0183257 A1 | 7/2008 | Imran et al. |
| 2008/0231955 A1 | 9/2008 | Otsuka |
| 2009/0295986 A1 | 12/2009 | Topliss et al. |
| 2010/0074607 A1 | 3/2010 | Topliss et al. |
| 2010/0074608 A1 | 3/2010 | Topliss |
| 2010/0119863 A1 * | 5/2010 | Bogursky .................. H01R 4/188 428/603 |
| 2011/0249131 A1 | 10/2011 | Topliss et al. |
| 2012/0019675 A1 | 1/2012 | Brown |
| 2012/0151913 A1 | 6/2012 | Foshansky |
| 2012/0154614 A1 | 6/2012 | Moriya et al. |
| 2012/0174574 A1 | 7/2012 | Kotanagi et al. |
| 2013/0016427 A1 | 1/2013 | Sugawara |
| 2013/0169092 A1 | 7/2013 | Neuhaus et al. |
| 2013/0221071 A1 | 8/2013 | Kim et al. |
| 2013/0222685 A1 | 8/2013 | Topliss et al. |
| 2013/0278785 A1 | 10/2013 | Nomura et al. |
| 2013/0292856 A1 | 11/2013 | Braun et al. |
| 2013/0300880 A1 | 11/2013 | Brown et al. |
| 2013/0338730 A1 | 12/2013 | Shiroff et al. |
| 2014/0055630 A1 | 2/2014 | Gregory et al. |
| 2015/0068013 A1 * | 3/2015 | Galu, Jr. .................. A44B 18/008 29/428 |
| 2015/0135703 A1 * | 5/2015 | Eddington .................. F03G 7/065 60/528 |
| 2015/0304561 A1 * | 10/2015 | Howarth .................. G02B 27/646 348/374 |
| 2015/0346507 A1 | 12/2015 | Howarth |
| 2015/0365568 A1 | 12/2015 | Topliss et al. |
| 2016/0154250 A1 | 6/2016 | Miller |
| 2016/0154251 A1 | 6/2016 | Ladwig et al. |
| 2016/0154252 A1 | 6/2016 | Miller et al. |
| 2016/0227088 A1 | 8/2016 | Brown et al. |
| 2016/0259177 A1 | 9/2016 | Ladwig et al. |
| 2016/0259178 A1 | 9/2016 | Miller |
| 2016/0263889 A1 | 9/2016 | Hamaguchi et al. |
| 2016/0294141 A1 | 10/2016 | Davis et al. |
| 2017/0131562 A1 | 5/2017 | Ladwig et al. |
| 2017/0160559 A1 | 6/2017 | Ladwig |
| 2017/0219842 A1 | 8/2017 | Howarth et al. |
| 2017/0336646 A1 | 11/2017 | Miller et al. |
| 2017/0357076 A1 | 12/2017 | Scheele et al. |
| 2018/0284475 A1 | 10/2018 | Howarth et al. |
| 2018/0321503 A1 | 11/2018 | Brown |
| 2018/0373056 A1 | 12/2018 | Ladwig et al. |
| 2019/0162982 A1 | 5/2019 | Miller |
| 2020/0218083 A1 | 7/2020 | Feng et al. |
| 2021/0223564 A1 | 7/2021 | Ladwig et al. |
| 2021/0356759 A1 | 11/2021 | Miller |

FOREIGN PATENT DOCUMENTS

| | | |
|---|---|---|
| CN | 100410690 C | 8/2008 |
| CN | 101246248 A | 8/2008 |
| CN | 101300831 A | 11/2008 |
| CN | 101408655 A | 4/2009 |
| CN | 101416090 A | 4/2009 |
| CN | 101668947 A | 3/2010 |
| CN | 101876742 A | 11/2010 |
| CN | 102089695 A | 6/2011 |
| CN | 102150073 A | 8/2011 |
| CN | 103376613 A | 10/2013 |
| CN | 203365875 U | 12/2013 |
| CN | 104956254 A | 9/2015 |
| EP | 1870962 A2 | 12/2007 |
| EP | 2140138 A2 | 1/2010 |
| EP | 2 732 331 A1 | 5/2014 |
| EP | 2920955 A1 | 9/2015 |
| JP | 57-201739 U | 12/1982 |
| JP | 59-104565 U | 7/1984 |
| JP | 64-73754 A | 3/1989 |
| JP | 1-186577 A | 7/1989 |
| JP | 3-58464 A | 3/1991 |
| JP | 5-283146 A | 10/1993 |
| JP | 6-275325 A | 9/1994 |
| JP | 7-259725 A | 10/1995 |
| JP | 2002-130114 A | 5/2002 |
| JP | 2002-367204 A | 12/2002 |
| JP | 2003-507625 A | 2/2003 |
| JP | 2006-031026 A | 2/2006 |
| JP | 2007-092556 A | 4/2007 |
| JP | 2007-227845 A | 9/2007 |
| JP | 2008-98389 A | 4/2008 |
| JP | 2008-233526 A | 10/2008 |
| JP | 2009-37059 A | 2/2009 |
| JP | 2009-103861 A | 5/2009 |
| JP | 2009-110868 A | 5/2009 |
| JP | 2009-531729 A | 9/2009 |
| JP | 2010-128262 A | 6/2010 |
| JP | 2010-192036 A | 9/2010 |
| JP | 2011-022250 A | 2/2011 |
| JP | 2011-065140 A | 3/2011 |
| JP | 2011-107413 A | 6/2011 |
| JP | 2011-175160 A | 9/2011 |
| JP | 2012-502323 A | 1/2012 |
| JP | 2012-517611 A | 8/2012 |
| JP | 2013-520701 A | 6/2013 |
| JP | 2013-522810 A | 6/2013 |
| JP | 2013-178457 A | 9/2013 |
| JP | 2013-546023 A | 12/2013 |

(56) References Cited

FOREIGN PATENT DOCUMENTS

| | | |
|---|---|---|
| JP | 2014-55527 A | 3/2014 |
| JP | 2014-225378 A | 12/2014 |
| JP | 2015-128267 A | 7/2015 |
| JP | 2015-518977 A | 7/2015 |
| JP | 2015-537247 A | 12/2015 |
| KR | 10-2009-0081855 A | 7/2009 |
| KR | 10-2013-0054234 A | 5/2013 |
| KR | 10-2015-0013017 A | 2/2015 |
| KR | 10-2015-0102966 A | 9/2015 |
| WO | WO 94/00186 A1 | 1/1994 |
| WO | WO 01/12985 A1 | 2/2001 |
| WO | 2006/016443 A1 | 2/2006 |
| WO | WO 2007/113478 A1 | 10/2007 |
| WO | WO 2008/099155 A1 | 8/2008 |
| WO | WO 2008/129291 A2 | 10/2008 |
| WO | WO 2010/004993 A1 | 1/2010 |
| WO | 2010/089526 A2 | 8/2010 |
| WO | 2011/104518 A1 | 9/2011 |
| WO | WO 2012/066285 A1 | 5/2012 |
| WO | 2013153400 A2 | 10/2013 |
| WO | 2013175197 A1 | 11/2013 |
| WO | 2014076463 A1 | 5/2014 |
| WO | 2014083318 A1 | 6/2014 |
| WO | 2015132571 A1 | 9/2015 |
| WO | 2016009200 A1 | 1/2016 |

OTHER PUBLICATIONS

International Preliminary Report on Patentability in International Application No. PCT/US2015/062713, dated Jun. 15, 2017.
International Preliminary Report on Patentability in International Application No. PCT/US2015/063363, dated Jun. 15, 2017.
International Preliminary Report on Patentability in international Application No. PCT/US2016/021230, dated Sep. 21, 2017.
International Search Report and Written Opinion in international Application No. PCT/US2015/066939, dated Mar. 14, 2016.
International Search Report and Written Opinion in International Application No. PCT/US2016/054274, dated Dec. 13, 2016.
Office Action in U.S. Appl. No. 14/956,612, dated Jan. 4, 2018.
Office Action in U.S. Appl. No. 15/156,545, dated May 8, 2017.
Office Action in U.S. Appl. No. 15/156,545, dated Dec. 26, 2017.
Office Action in U.S. Appl. No. 15/276,115, dated Sep. 18, 2017.
Office Action in U.S. Appl. No. 15/400,516, dated Sep. 21, 2017.
Office Action in U.S. Appl. No. 15/400,516, dated Dec. 15, 2017.
Extended European Search Report in European Application No. 15866032.4, dated Mar. 22, 2018.
Extended European Search Report in European Application No. 15864743.8, dated Mar. 22, 2018.
Extended European Search Report in European Application No. 15865383.2, dated Mar. 22, 2018.
Notice of Allowance in U.S. Appl. No. 15/276,115, dated Mar. 26, 2018.
International Search Report and Written Opinion issued in PCT/US2015/062576, dated Mar. 2, 2016, 16 pages.
International Search Report and Written Opinion issued in PCT/US2015/062713, dated Mar. 2, 2016, 16 pages.
International Search Report and Written Opinion issued in PCT/US2015/063363, dated Feb. 12, 2016, 15 pages.
International Search Report and Written Opinion issued in PCT/US2016/021230, dated Jun. 3, 2016, 23 pages.
International Search Report and Written Opinion issued in PCT/US2016/025194, dated Jun. 30, 2016, 23 pages.
International Search Report and Written Opinion in International Application No. PCT/US2017/033517, dated Aug. 4, 2017.
International Search Report and Written Opinion in International Application No. PCT/US2017/036884, dated Oct. 19, 2017.
Corrected Notice of Allowance in U.S. Appl. No. 15/276,115, dated Jul. 3, 2018.
Notice of Allowance in U.S. Appl. No. 15/400,516, dated May 4, 2018.
Office Action in U.S. Appl. No. 15/599,449, dated Jan. 25, 2018.
Extended European Search Report in European Application No. 16762309.9, dated Aug. 1, 2018.
International Preliminary Report on Patentability in International Application No. PCT/US2017/033517, dated Nov. 29, 2018.
Office Action in U.S. Appl. No. 14/956,612, dated Aug. 9, 2018.
Notice of Allowance in U.S. Appl. No. 15/156,545, dated Jul. 26, 2018.
Office Action in U.S. Appl. No. 15/599,449, dated Oct. 31, 2018.
Office Action in U.S. Appl. No. 15/618,917, dated Jan. 11, 2019.
Third Office Action in Chinese Patent Application No. 201580065890.7 dated Feb. 18, 2020.
Decision to Grant for Japanese Patent Application No. 2017-529039 dated Mar. 17, 2020.
Notice of Reasons for Refusal for Japanese Patent Application No. 2017-546796 dated Mar. 31, 2020.
Extended European Search Report in European Patent Application No. 17811132.4, dated Jan. 23, 2020.
Office Action in Chinese Application No. 201580065890.7, dated Mar. 27, 2019.
Second Office Action in Chinese Application No. 201580065890.7, dated Sep. 29, 2019.
Notice of Reasons for Refusal in Japanese Patent Application No. 2017-529018 dated Jan. 7, 2020.
Office Action in Chinese Application No. 201580065775.X, dated Mar. 27, 2019.
Second Office Action in Chinese Patent Application No. 201580065775.X, dated Dec. 25, 2019.
Notice of Reasons for Refusal in Japanese Patent Application No. 2017-529039 dated Dec. 3, 2019.
Extended European Search Report in European Application No. 19193083.3, dated Oct. 29, 2019.
Office Action in Chinese Application No. 201580065332.0, dated Mar. 18, 2019.
Second Office Action in Chinese Patent Application No. 201580065332.0, dated Dec. 16, 2019.
Notice of Reasons for Refusal in Japanese Patent Application No. 2017-529044 dated Jan. 7, 2020.
Examination Report in European Application No. 16762309.9, dated Apr. 4, 2019.
Office Action in Chinese Application No. 201680025323.3, dated Dec. 28, 2018.
Second Office Action in Chinese Patent Application No. 201680025323.3, dated Sep. 30, 2019.
Extended European Search Report in European Application No. 19173490.4, dated Jul. 12, 2019.
Extended European Search Report in European Patent Application No. 17800231.7, dated Dec. 9, 2019.
International Preliminary Report on Patentability in International Application No. PCT/US2017/036884, dated Dec. 20, 2018.
Office Action in U.S. Appl. No. 14/956,612, dated May 31, 2019.
Office Action in U.S. Appl. No. 16/200,570, dated Dec. 9, 2019.
Office Action in U.S. Appl. No. 15/599,449, dated Apr. 17, 2019.
Notice of Allowance in U.S. Appl. No. 15/599,449, dated Jan. 27, 2020.
Office Action in U.S. Appl. No. 15/618,917, dated Aug. 9, 2019.
Notice of Allowance in U.S. Appl. No. 15/618,917, dated Jan. 17, 2020.
Allen, K.W., "Adhesion 12," Elsevier Applied Science, 1988, p. 98.
Decision to Grant for Japanese Application No. 2017-529018, dated May 26, 2020.
Decision to Grant for Japanese Application No. 2017-529044, dated May 26, 2020.
Notice of Decision of Refusal in Japanese Application No. 2017-546796, dated Dec. 15, 2020.
Office Action in Chinese Application No. 201780044616,0, dated Jul. 24, 2020.
Office Action in Chinese Application No. 201780047685,7, dated Jun. 15, 2020.
Notice of Allowance in U.S. Appl. No. 14/956,612, dated May 14, 2020.
Office Action in U.S. Appl. No. 16/119,619, dated May 5, 2020.
Office Action in U.S. Appl. No. 16/119,619, dated Jul. 17, 2020.

(56) References Cited

OTHER PUBLICATIONS

Office Action in U.S. Appl. No. 16/200,570, dated Jul. 2, 2020.
Office Action in U.S. Appl. No. 15/618,917, dated May 21, 2020.
Office Action in U.S. Appl. No. 15/618,917, dated Oct. 6, 2020.
Office Action in U.S. Appl. No. 16/200,570, dated Dec. 9, 2020.
Notice of Allowance in U.S. Appl. No. 16/119,619, dated Dec. 2, 2020.
Notice of Reasons for Refusal in Japanese Application No. 2020-072465, dated Mar. 9, 2021.
Notice of Reasons for Refusal in Japanese Application No. 2018-564209, dated Jan. 26, 2021.
Notice of Allowance in U.S. Appl. No. 16/200,570, dated Mar. 25, 2021.
Office Action in U.S. Appl. No. 15/618,917, dated Feb. 19, 2021.
Office Action in Chinese Application No. 201780044616.0, dated Apr. 9, 2021.
Office Action in Chinese Application No. 201780047685.7, dated May 6, 2021.
Notice of Reasons for Refusal in Japanese Application No. 2018-560855, dated Jun. 8, 2021.
Notice of Preliminary Rejection in Korean Application No. 10-2018-7036332, dated May 26, 2021.
Office Action in U.S. Appl. No. 15/618,917, dated Jun. 24, 2021.
Notice of Reasons for Refusal in Japanese Application No. 2017-546796, dated Nov. 16, 2021.
Office Action in Chinese Application No. 202010257836.5, dated Aug. 26, 2021.
Notice of Decision of Refusal in Japanese Application No. 2020-072465, dated Jan. 25, 2022.
Office Action in Chinese Application No. 202010580844.3, dated Oct. 21, 2021.
Examination Report in European Application No. 17811132.4, dated Sep. 28, 2021.
Office Action in Chinese Application No. 201780047685.7, dated Dec. 1, 2021.
Notice of Preliminary Rejection in Korean Application No. 10-2019-7000337, dated Feb. 22, 2022.
Notice of Allowance in U.S. Appl. No. 15/618,917, dated Mar. 15, 2022.
Notice of Preliminary Rejection in Korean Application No. 10-2017-7014694, dated Sep. 13, 2022.
Notice of Preliminary Rejection in Korean Application No. 10-2017-7014695, dated Sep. 13, 2022.
Notice of Preliminary Rejection in Korean Application No. 10-2017-7014693, dated Sep. 19, 2022.
Decision to Grant for Japanese Application No. 2021-068927, dated Dec. 6, 2022.
Notice of Final Rejection in Korean Application No. 10-2019-7000337, dated Oct. 20, 2022.
Notice of Allowance in U.S. Appl. No. 17/222,144, dated Dec. 16, 2022.
Office Action in U.S. Appl. No. 17/385,806, dated Nov. 22, 2022.
Notice of Reasons for Refusal in Japanese Application No. 2017-546796, dated Jun. 28, 2022.
Notice of Reasons for Refusal in Japanese Application No. 2021-068927, dated May 31, 2022.
Office Action in Chinese Application No. 201780047685.7, dated Apr. 29, 2022.
Office Action in Chinese Application No. 202010257836.5, dated Aug. 1, 2022.
Office Action in Chinese Application No. 202010580844.3, dated Aug. 16, 2022.
Notice of Reasons for Refusal in Japanese Application No. 2021-124259, dated Sep. 13, 2022.
Notice of Allowance in Korean Application No. 10-2017-7014694, dated Mar. 21, 2023.
Notice of Allowance in Korean Application No. 10-2017-7014695, dated Mar. 28, 2023.
Notice of Allowance in Korean Application No. 10-2017-7014693, dated Mar. 29, 2023.
Notice of Preliminary Rejection in Korean Application No. 10-2017-7027642, dated Mar. 29, 2023.
Office Action in Chinese Application No. 202010257836.5, dated Feb. 21, 2023.
Office Action in Chinese Application No. 202010580844.3, dated Feb. 3, 2023.
Notice of Final Rejection in Korean Application No. 10-2019-7000337, dated Mar. 17, 2023.
Notice of Reasons for Refusal in Japanese Application No. 2021-124259, dated Mar. 28, 2023.
Office Action in U.S. Appl. No. 17/385,806, dated Apr. 21, 2023.

* cited by examiner

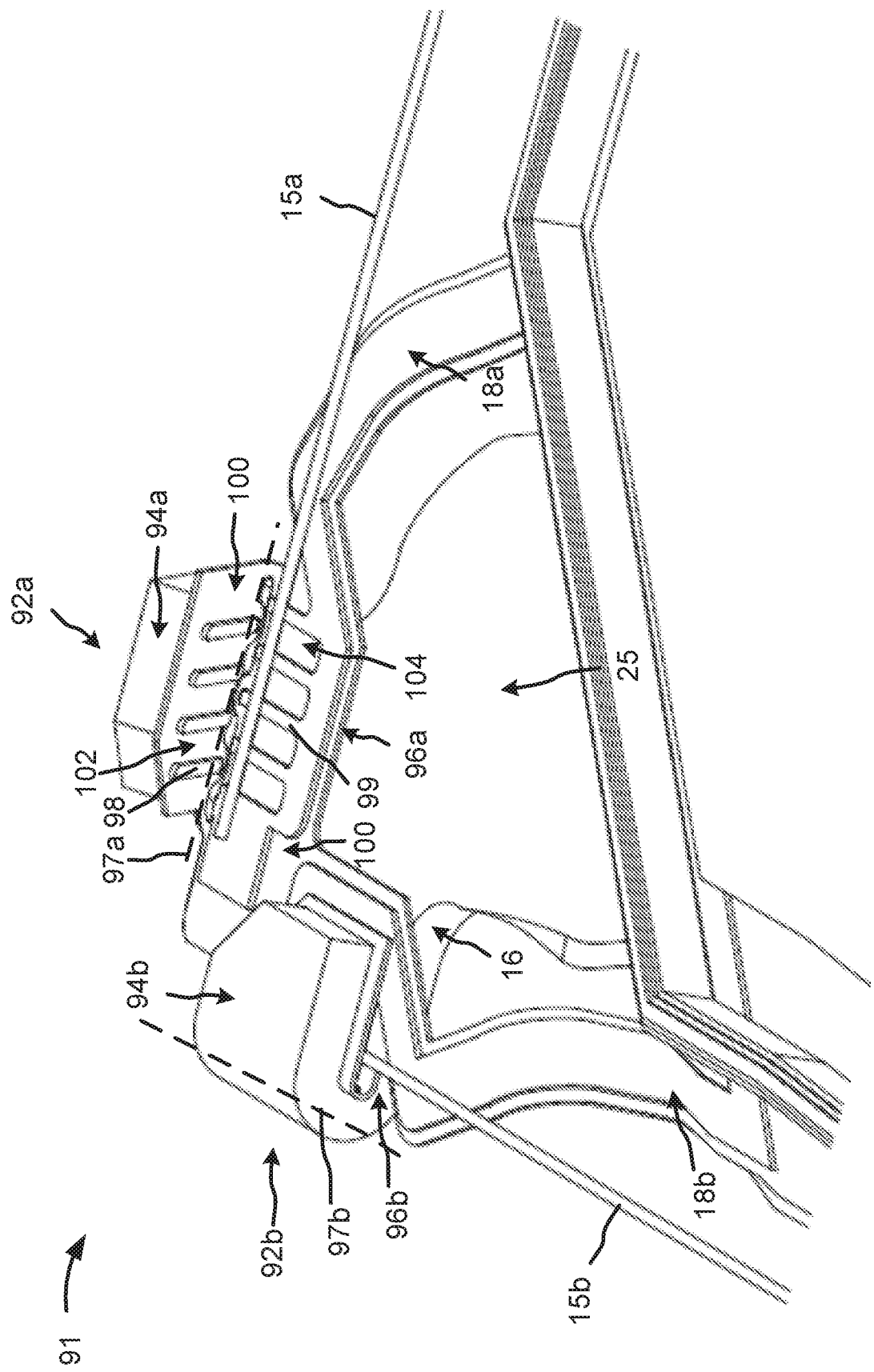

SHAPE MEMORY ALLOY WIRE ATTACHMENT STRUCTURES FOR A SUSPENSION ASSEMBLY

CROSS REFERENCE TO RELATED APPLICATION

This application claims the benefit of U.S. Provisional Application No. 62/129,562 filed on Mar. 6, 2015 and entitled Two-Piece Camera Lens Suspension With Integrated Electrical Leads, which is incorporated herein by reference in its entirety and for all purposes.

TECHNICAL FIELD

Embodiments of the present disclosure relate generally to suspension assemblies using shape-memory alloy (SMA) wires. In particular, embodiments of the disclosure relate to an attachment structure that crimps an SMA wire, which couples a support member of a suspension assembly to a moving member of a suspension assembly.

BACKGROUND

Various suspension assemblies use SMA wires to couple a support member of a suspension assembly to a moving member of the suspension assembly. For example, suspensions using SMA wires can be found in camera lens suspension systems. PCT International Application Publication Nos. WO 2014/083318 and WO 2013/175197 disclose a camera lens optical image stabilization (OIS) suspension system that has a moving assembly (to which a camera lens element can be mounted) supported by a flexure element or spring plate on a stationary support assembly. The flexure element, which is formed from metal such as phosphor bronze, has a moving plate and flexures. The flexures extend between the moving plate and the stationary support assembly and function as springs to enable the movement of the moving assembly with respect to the stationary support assembly. In addition to this mechanical function, the flexures provide electrical connections from the support assembly to structures such as the camera lens element mounted to the moving assembly. The moving assembly and support assembly are coupled by shape memory alloy (SMA) wires extending between the assemblies. Each of the SMA wires has one end attached to the support assembly, and an opposite end attached to the moving assembly. The suspension is actuated by applying electrical drive signals to the SMA wires. The above-identified PCT publications are incorporated herein by reference for all purposes.

There remains a continuing need for improved lens suspensions. In particular, there is a need for such suspension structures with improved structures for coupling electrical signals on the suspensions that do not damage the SMA wires and/or are less susceptible to the SMA wires being damaged when the suspensions are in use. Suspension structures of these types that are highly functional, robust and efficient to manufacture would be particularly desirable.

SUMMARY

Embodiments of the disclosure relate to improved suspensions having integrated electrical traces that couple the SMA wires in a manner that may reduce the likelihood of damaging the SMA wires. The suspension is functional, robust and efficient to manufacture.

In an embodiment, a suspension assembly comprises: a support member including a metal base layer, wherein the metal base layer includes a first attachment structure, the first attachment structure including: a first portion including first conductive traces being spaced apart by first spaces and a dielectric between the base layer and the first traces; and a second portion configured to be crimped together with the first portion, the second portion including second conductive traces being spaced apart by second spaces and a dielectric between the base layer and the second traces, wherein the first spaces substantially align with the second traces and the first traces substantially align with the second spaces; and a moving member movably coupled to the support member, the moving member including a plate, wherein the plate includes a second attachment structure; and a shape-memory alloy wire being coupled to the first and second portions and the second attachment structure.

In another embodiments, a suspension assembly comprises: a support member including a metal base layer, wherein the metal base layer includes a first attachment structure; a moving member movably coupled to the support member, the moving member including a plate, wherein the plate includes a second attachment structure, the second attachment structure including: a first portion including first dielectric members being spaced apart by first spaces; and a second portion configured to be crimped together with the first portion, the second portion including second dielectric members being spaced apart by second spaces, wherein the first spaces substantially align with the second members and the first members substantially align with the second spaces; and a shape-memory alloy wire being coupled to the first attachment structure and the first and second portions.

In another embodiments, a suspension assembly comprises: a support member including a metal base layer, wherein the base layer includes a first attachment structure; a moving member movably coupled to the support member, the moving member including a plate, wherein the plate includes a second attachment structure, the second attachment structure including: a first portion; and a second portion configured to be crimped together with the first portion, wherein at least one of the first and second portions includes at least one etched recess; and a shape-memory alloy wire coupled to the first attachment structure and the first and second portions.

In another embodiment, a suspension assembly comprises: a support member including: a metal base layer, wherein the base layer includes a first attachment structure, the first attachment structure including: a first portion including a recess, a platform and a first edge between the recess and platform; and a second portion configured to be crimped together with the first portion, the second portion including a second edge that is offset from the first edge, the first and second edges forming a cutting edge when the first and second portions are crimped together; a moving member movably coupled to the support member, the moving member including a plate, wherein the plate includes a second attachment structure; and a shape-memory alloy wire being coupled to the second structure and the first and second portions.

In another embodiment, a suspension assembly comprises: a support member including a metal base layer, wherein the base layer includes a first attachment structure; a moving member movably coupled to the support member, the moving member including a plate, wherein the plate includes a second attachment structure, the second attachment structure including: a first portion; a second portion configured to be crimped together with the first portion; and a member extending from at least one side of the first and second portions when the first and second portions are crimped together; and a shape-memory alloy wire coupled to the first attachment structure, the first and second portions and the mechanical engagement member.

In another embodiment, a suspension assembly, comprises: a support member including a metal base layer, wherein the base layer includes a first attachment structure; a moving member movably coupled to the support member, the moving member including: a plate including a first portion; and a second portion configured to be crimped together with the first portion, wherein the second portion is non-unitary with the first portion and coupled to the first portion using at least one of: an adhesive, a weld and a solder joint; and a shape-memory alloy wire coupled to the first attachment structure and the first portion and second portions.

The support member includes a metal base layer, conductive traces on the base layer, dielectric between the base layer and the traces, and a shape memory alloy wire attach structure. The moving member includes a plate, flexure arms extending from the plate and coupled to the support member, a metal base layer in the plate and flexure arms, conductive traces on the base layer of the flexure arms and optionally the plate, dielectric between the base layer and the traces, and a shape memory alloy wire attach structure. The conductive traces on the flexure arms are electrically connected to the conductive traces on the support member.

BRIEF DESCRIPTION OF THE DRAWINGS

FIG. 15A is a top isometric view of an attachment structure that can be incorporated into the support member, in accordance with embodiments of the disclosure.

DETAILED DESCRIPTION

Figure 1A:
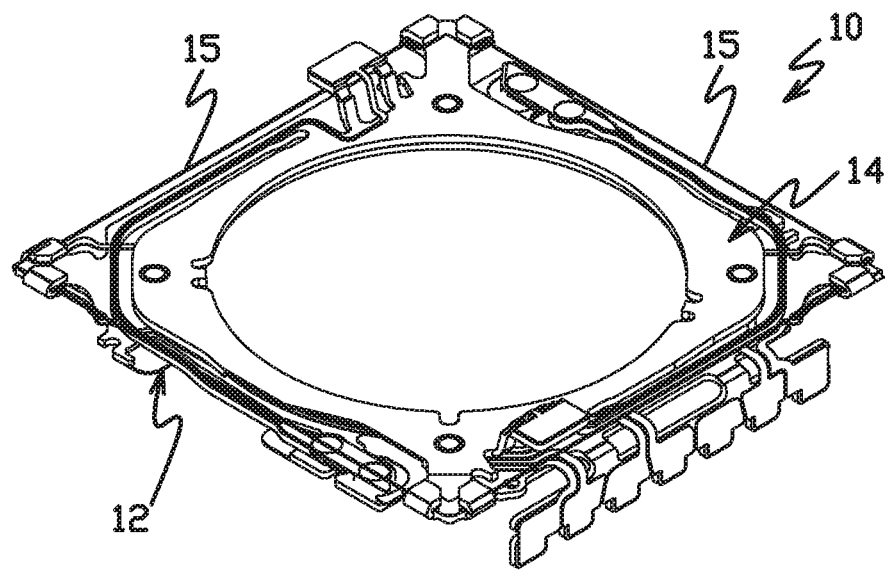
FIG. 1A is a top isometric view of a suspension in accordance with embodiments of the disclosure.
Figure 1B:
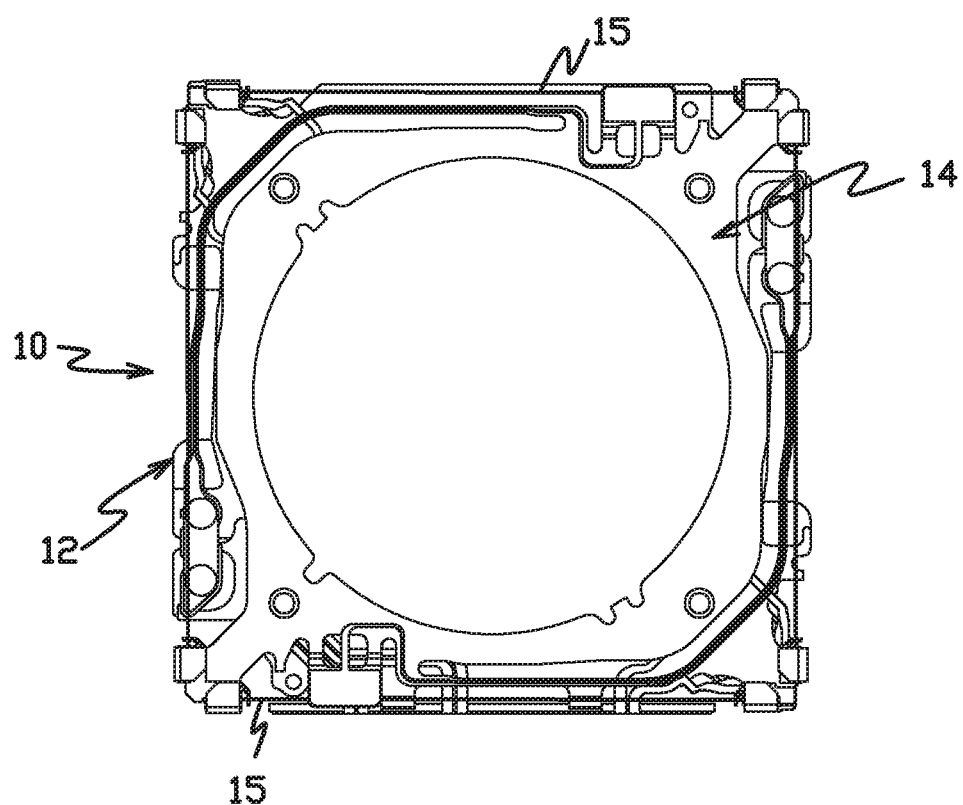
FIG. 1B is a top plan view of the suspension shown in FIG. 1A.
Figure 2A:
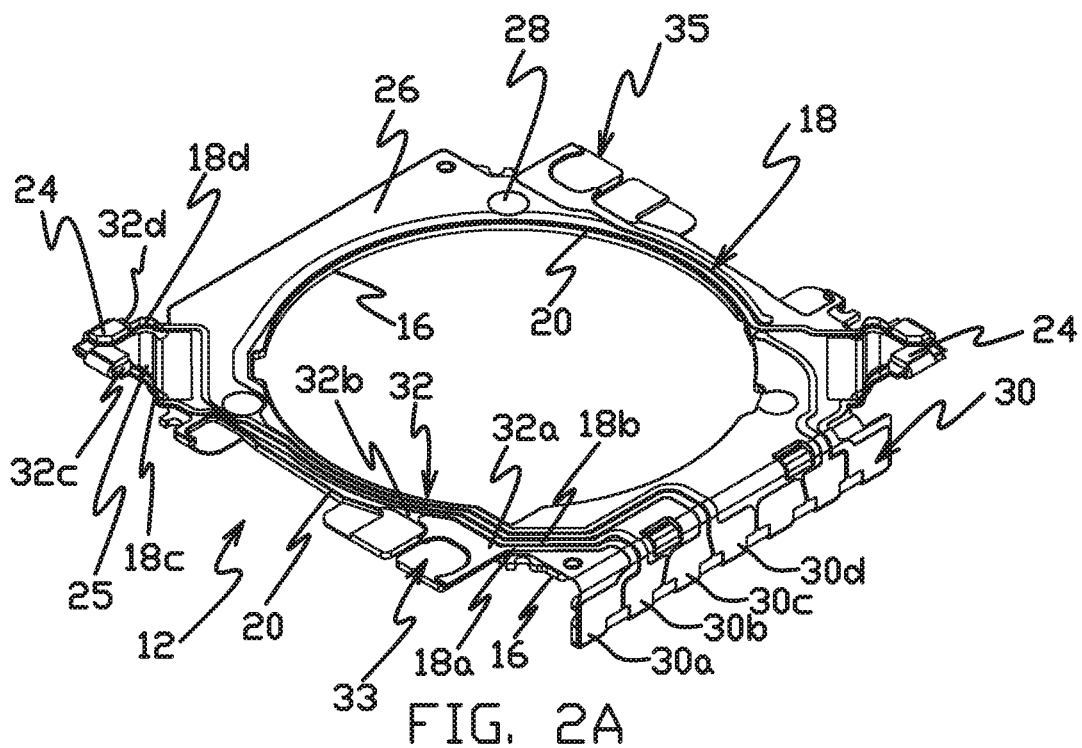
FIG. 2A is a top isometric view of the support member of the suspension shown in FIG. 1A.
Figure 2B:
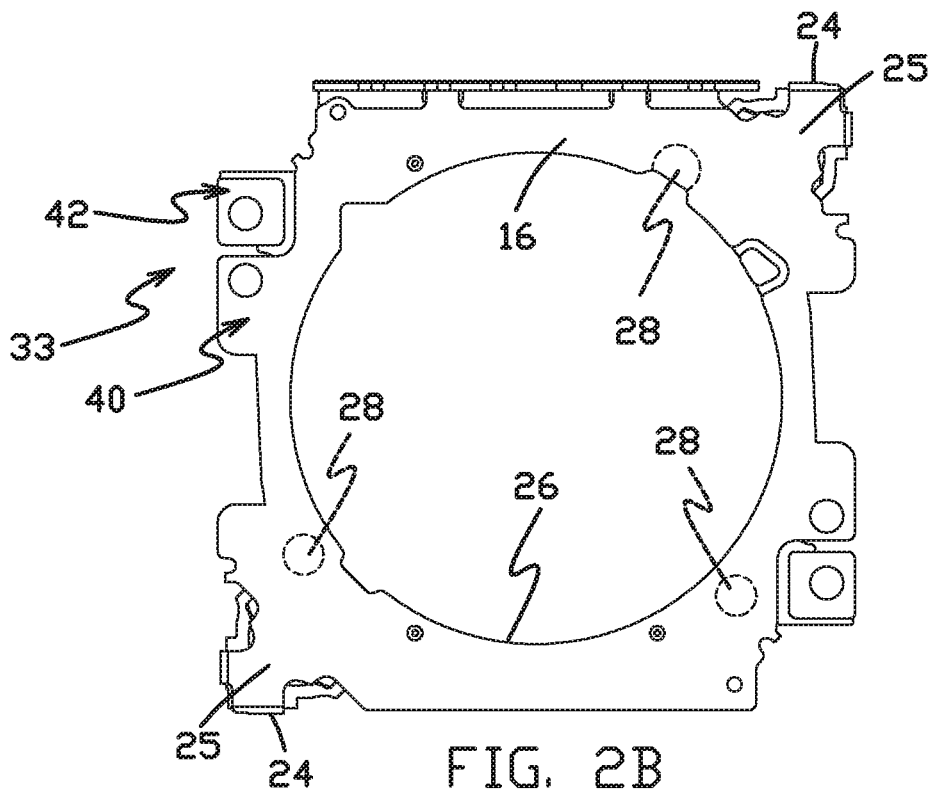
FIG. 2B is a bottom plan view of the support member shown in FIG. 2A.

FIGS. 1A and 1B illustrate a suspension assembly 10 in accordance with embodiments of the disclosure. As shown, the suspension assembly 10 includes a flexible printed circuit (FPC) or support member 12 and a spring crimp circuit or moving member 14 that is coupled to the support member. Shape memory alloy (SMA) wires 15 extend between the support member 12 and the moving member 14, and can be electrically actuated to move and control the position of the moving member with respect to the support member. In embodiments, the suspension assembly 10 is a camera lens optical image stabilization (OIS) device that can be incorporated, for example, into mobile phones, tablets, laptop computers.

FIGS. 2A, 2B, 3A and 3B illustrate the support member 12 in greater detail. As shown, the support member 12 includes a base layer 16 and a plurality of conductive traces 18 such as traces 18a-18d in a conductor layer on the base layer. A layer of dielectric 20 is located between the conductive traces 18 and the base layer 16 to electrically insulate the traces from the base layer 16. A plurality of wire attach structures such as crimps 24 (i.e., static crimps; four are shown in the illustrated embodiment) are located on the base layer 16. In the illustrated embodiment the crimps 24 are organized as two pairs of adjacent structures that are integrally formed on a ledge 25 in the base layer 16 at a level spaced (e.g., in a z-direction) from a major planar surface portion 26 of the base layer 16. Other embodiments (not shown) include other wire attach structures (e.g., solder pads) and/or wire attach structures that are organized in other arrangements (e.g., singly rather than in pairs). In embodiments, bearing-retaining recesses 28 are formed in the portion 26 of base layer 16. Bearings (not shown) in the recesses 28 can engage the moving member 14 and movably support the moving member with respect to the support member 12. Traces 18 include terminals 30 and contact pads 32 in the conductor layer on the base layer 16. Each of the traces 18 couples a terminal 30 to a contact pad 32. For example, contact pads 32a and 32b are at a first mount region 33 of the support member 12, and traces 18a and 18b couple terminals 30a and 30b to pads 32a and 32b, respectively. Contact pads 32 at a second mount region 35 are similarly coupled to terminal 30 by traces 18. A contact pad 32 is located at each of the crimps 24 in the illustrated embodiment, and each of the contact pads is coupled by a separate trace to a separate terminal 30 (e.g., trace 18d couples terminal 30d to pad 32d). The portion of the base layer 16 on which the terminals 30 are located is formed out of the plane of the major surface portion 26 (e.g., perpendicular to the plane of the major surface portion in the illustrated embodiment).

Figure 3A:
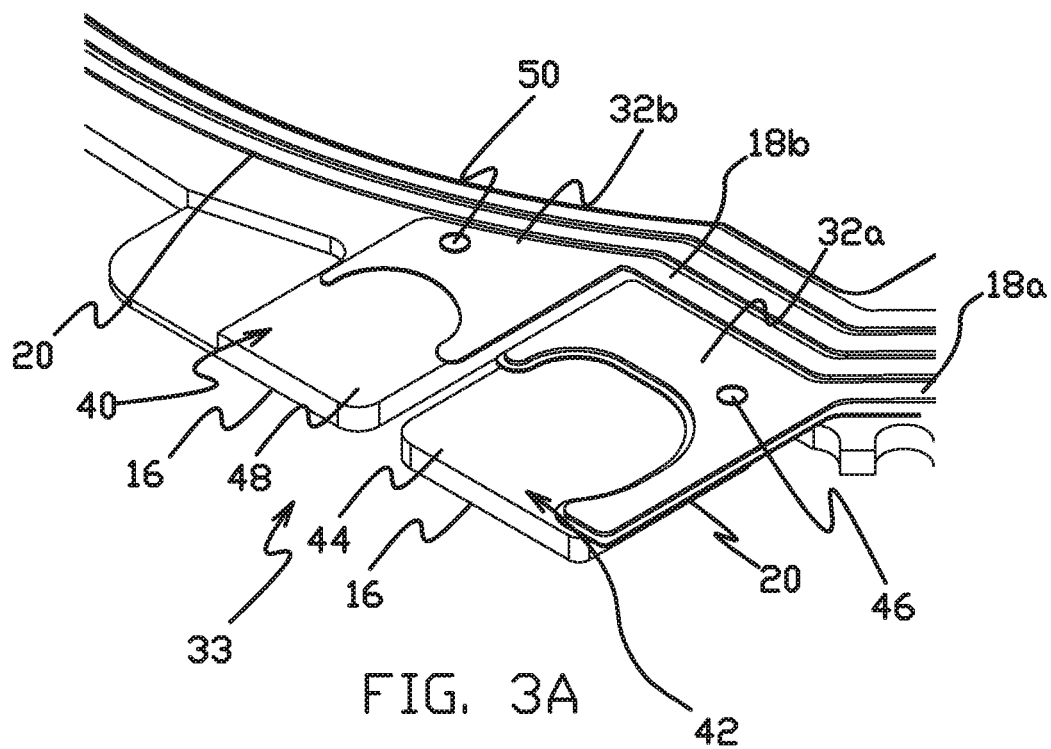
FIG. 3A is a detailed top isometric view of a mount region of the support member shown in FIG. 2A.
Figure 3B:
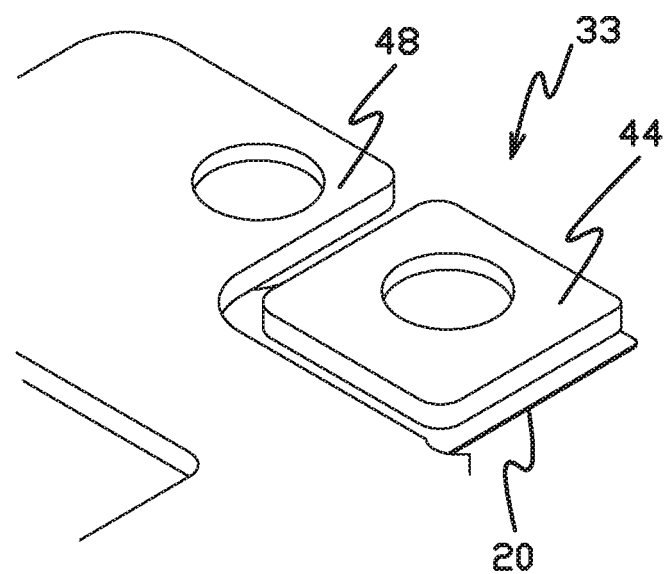
FIG. 3B is a detailed bottom isometric view of the mount region of the support member shown in FIG. 2A.

FIGS. 3A and 3B illustrate in greater detail embodiments of the mount region 33 of the support member 12. As shown, the mount region 33 includes first and second mounting pads 40 and 42. Mounting pad 42 includes an island or pad portion 44 in the base layer 16 that is electrically isolated from other portions of the base layer. The island pad portion 44 can be supported in part from adjacent portions of the base layer 16 by areas of dielectric 20 that extend between the island pad portion and adjacent portions of the base layer. Trace 18a and contact pad 32a extend to the island pad portion 44, and in embodiments are electrically connected to the island pad portion 44 by an electrical connection such as a plated or other via 46 that extends through the dielectric 20 at the mounting pad 42. Other embodiments include other electrical connections in place of or in addition to via 46, such as, for example, conductive adhesive that extends between the contact pad 32a and island pad portion 44 over the edges of the dielectric 20. Mounting pad 40 is adjacent to mounting pad 42, and includes a pad portion 48 in the base layer 16 (that in embodiments functions as an electrical ground or common structure), and an electrical connection such as via 50 that connects the contact pad 32b to the pad portion 48. The mount region 35 can be similar to mount region 33.

FIGS. 4A, 4B, 5, 6 and 7 illustrate embodiments of the moving member 14 in greater detail. As shown, the moving member 14 includes a plate 60 and spring or flexure arms 62 extending from the plate 60. In the illustrated embodiments, the plate 60 is a rectangular member, and each flexure arm 62 is an elongated member having first and second portions 64 and 66 that extend along two sides of the periphery of the plate. The plate 60 and flexure arms 62 are formed in a spring metal base layer 68 such as stainless steel. Moving member 14 also includes SMA wire attach structures such as crimps 70 (moving crimps; four are shown in the illustrated embodiment, organized in pairs). In the illustrated embodiment, the crimps 70 are unitary with and formed from the same spring metal base layer 68 as the plate 60 (i.e., on ends of arms 72 extending from the plate). Moving member 14 is configured differently in other embodiments. For example, in other embodiments (not shown) the flexure arms 62 can be shaped differently, be different in number, organized differently, and/or can extend from other locations on the plate 60. In still other embodiments (not shown), the crimps 70 can be formed as separate structures that are attached to the plate 60 (i.e., not unitary with the plate). Other embodiments (not shown) include other types of wire attach structures (e.g., solder pads) and/or wire attach structures that are organized in other arrangements (e.g., singly rather than in pairs).

The end portions of the flexure arms 62 have mount regions 74 that are configured to be mounted to the mount regions 33 and 35 of the support member 12. Conductive traces 76 on the base layer 68 extend on the flexure arms 62 from the mount regions 74. In embodiments, the traces 76 also extend on the base layer 68 over portions of the plate 60. In the illustrated embodiment, the traces 76 also extend to contact pads 77 on the arms 72 on the plate 60. In the illustrated embodiment, the contact pads 77 are on platforms extending out of the major planar surface of the plate 60. The contact pads are at other locations (e.g., on the plate 60) in other embodiments (not shown). A layer of dielectric 78 is located between the conductive traces 76 and the base layer 68 to electrically insulate the traces from the base layer. Mount regions 74 include first and second mounting pads 80 and 82. Each mounting pad 82 includes an island or pad portion 84 in the base layer 68 that is electrically isolated from other portions of the base layer. Each trace 76 extends from the mounting pad 82, over (and electrically insulated from) the mounting pad 80. In the illustrated embodiment, the portions of traces 76 extending between the mounting pads 80 and 82 are enlarged over the portions of the traces on the flexure arms 62 to provide support for the island pad portions 84 in the base layer 68. The traces 76 extend to the island pad portions 84, and in embodiments are electrically connected to the island pad portions by electrical connections such as a plated or other via 86 that extends through the dielectric 78 at the mounting pad 82. Other embodiments include other electrical connections in place of or in addition to vias 86, such as conductive adhesive that extends between the trace 76 and island pad portion 84 over the edges of the dielectric 78. Mounting pad 80 includes a pad portion 90 in the base layer 68 that is electrically isolated from the trace 76 by the dielectric 78. In the illustrated embodiments, the portions of the traces 76 over the mounting pads 80 and 82 are circular and open in the center, but take other forms in other embodiments (not shown).

Figure 7:
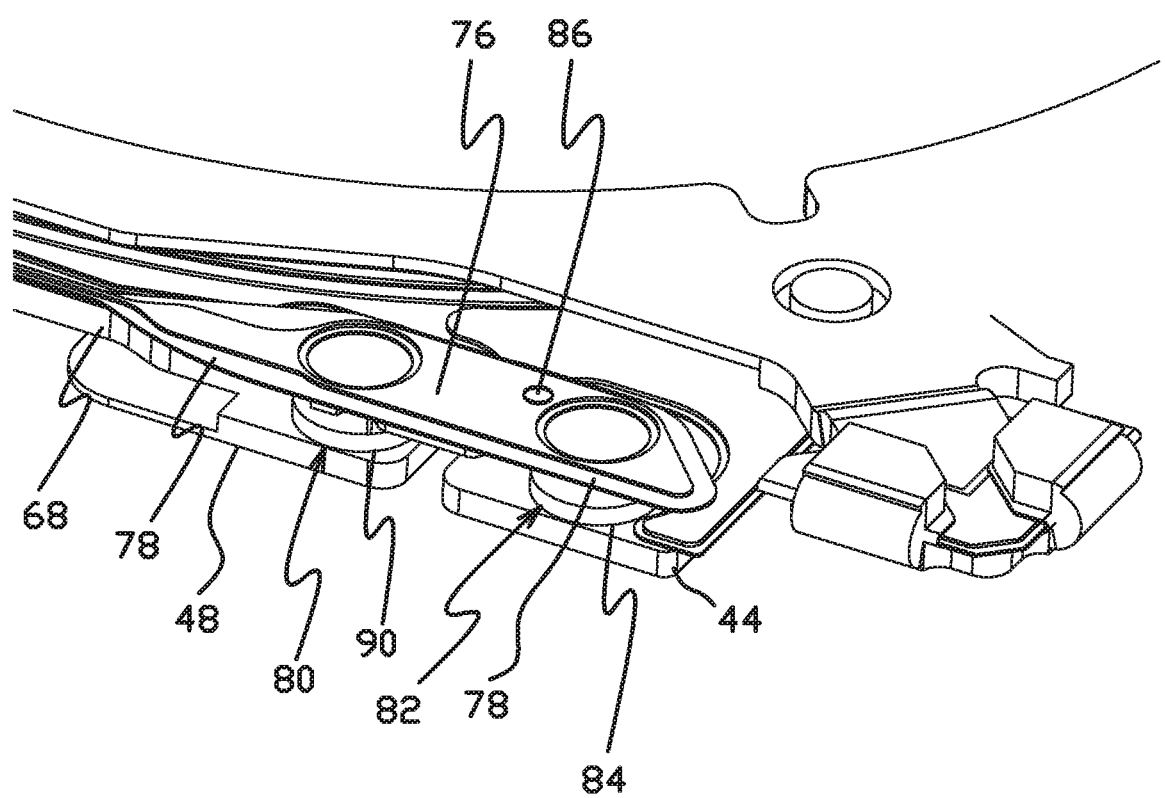
FIG. 7 is a detailed top isometric view of a support member mount region and a flexure arm mount region of the suspension shown in FIG. 1A.
Figure 8:
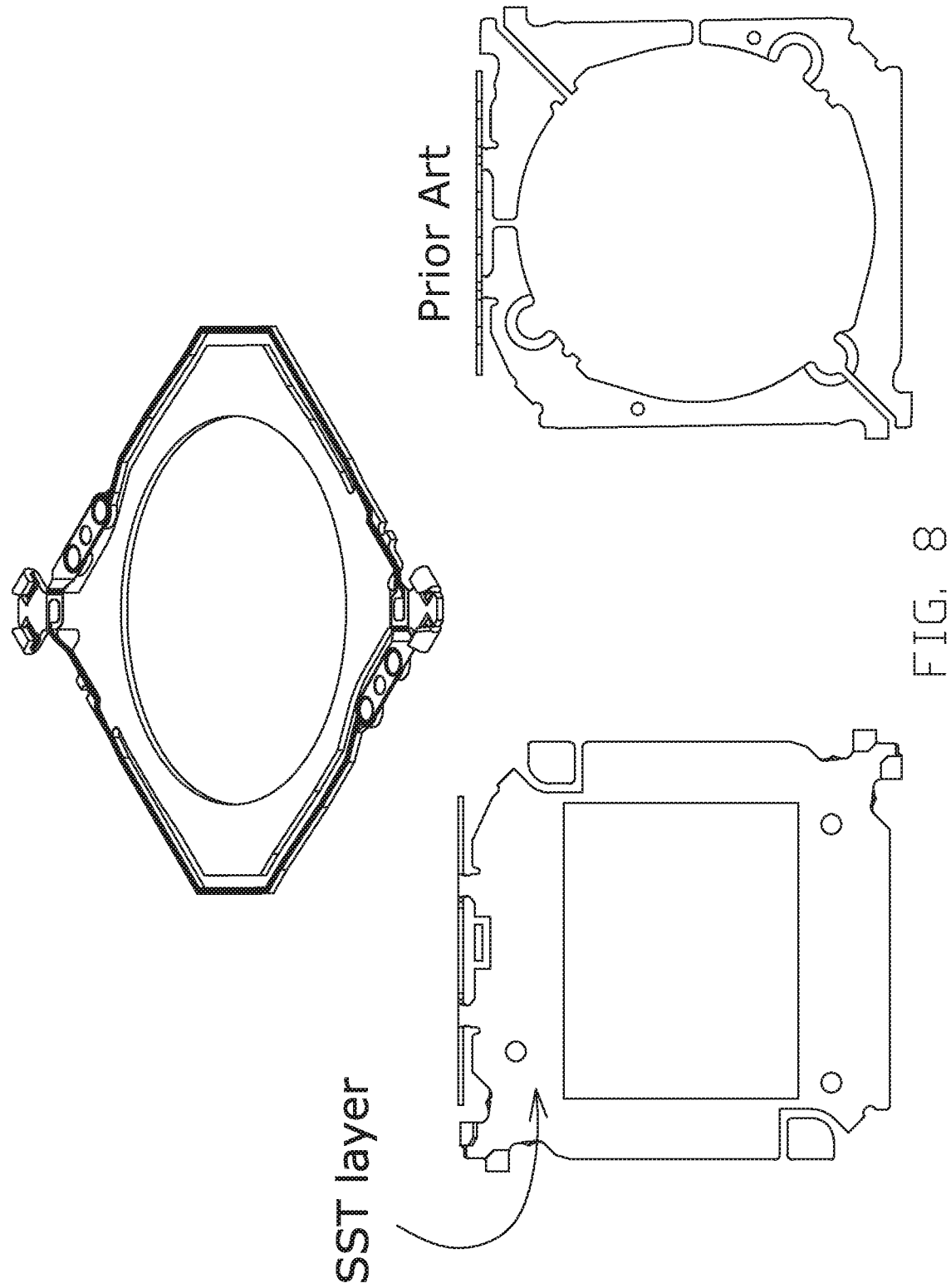
FIGS. 8-14 are annotated illustrations of embodiments of the suspension.
Figure 9:
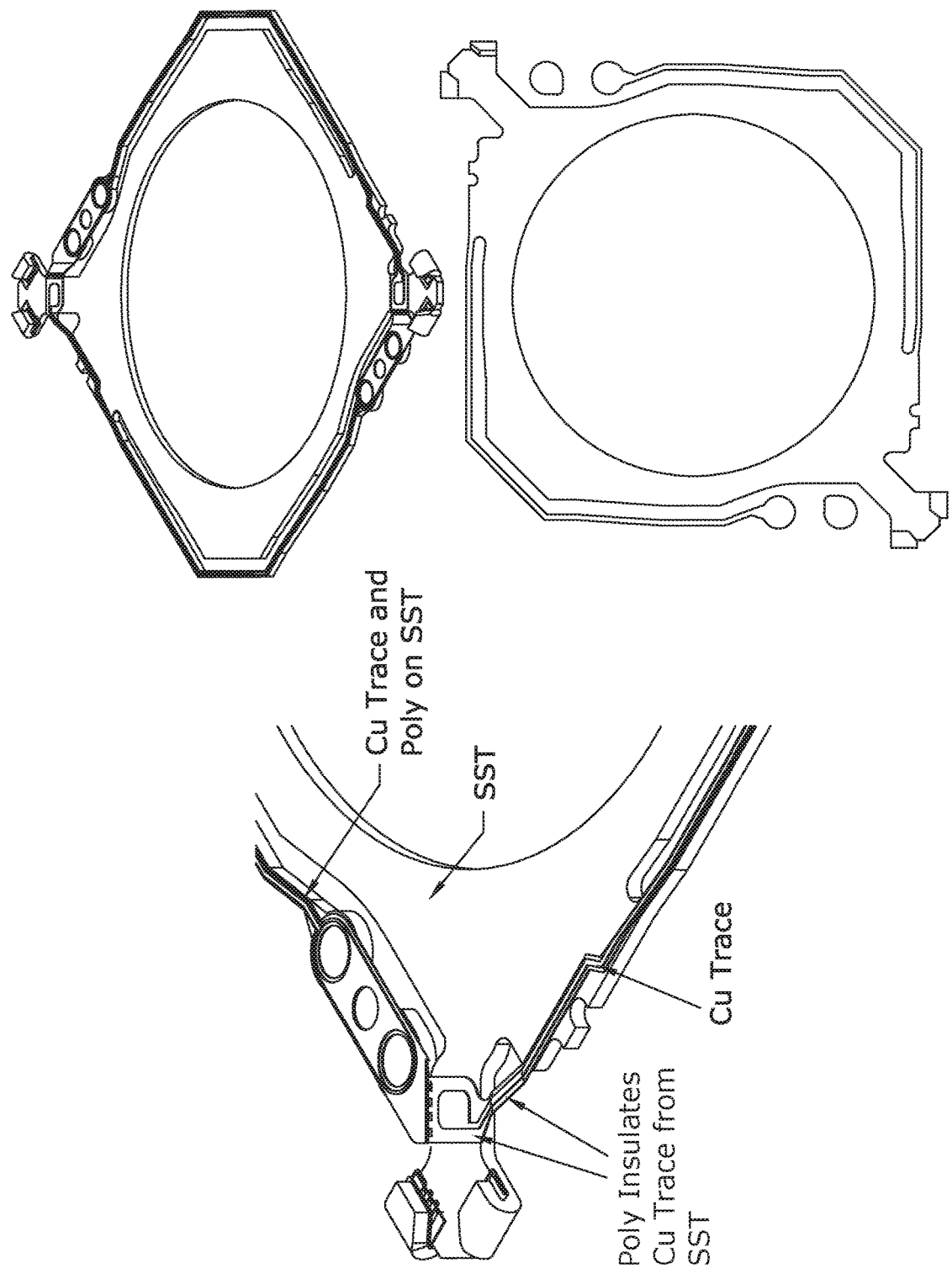
Figure 10:
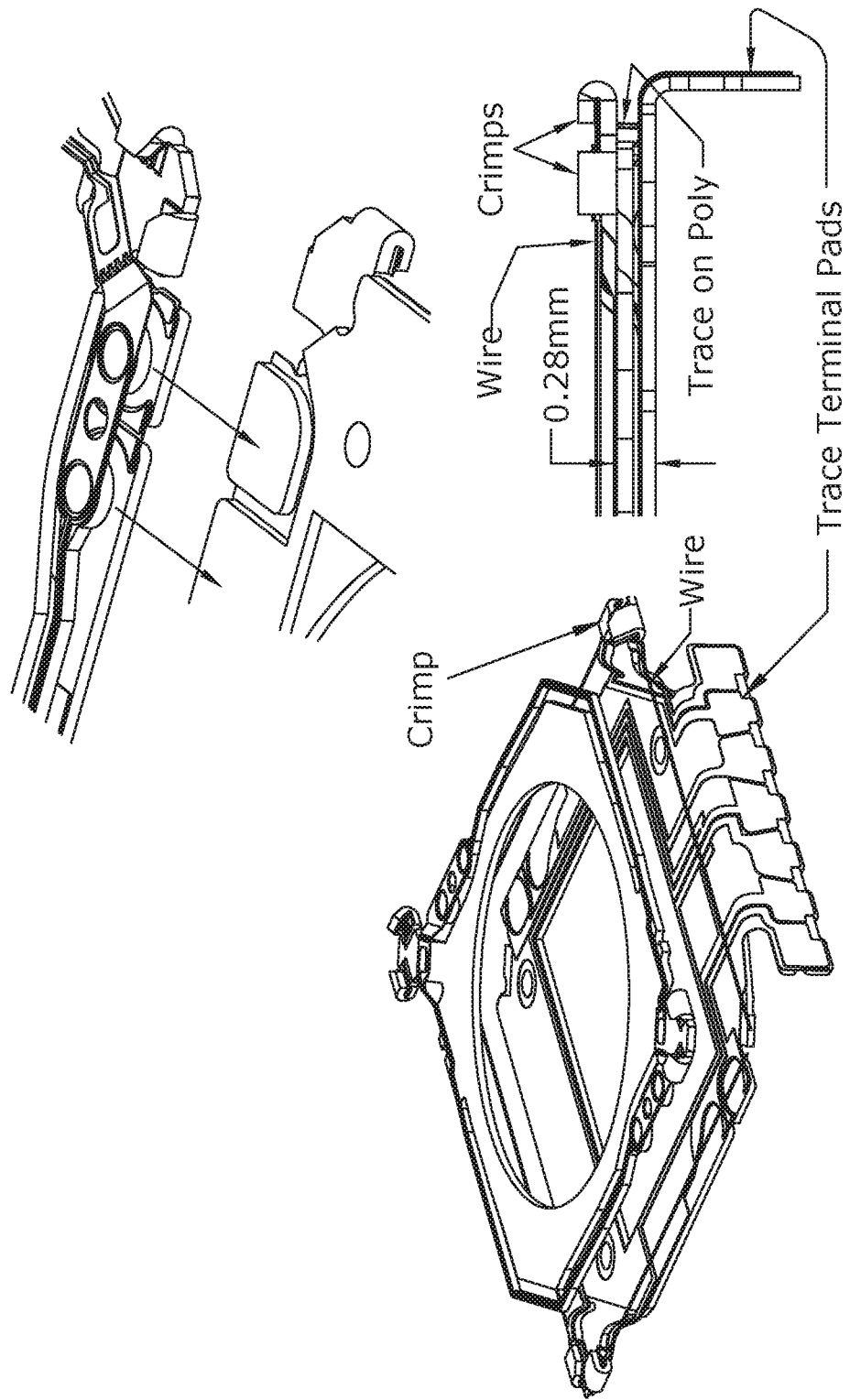
Figure 11:
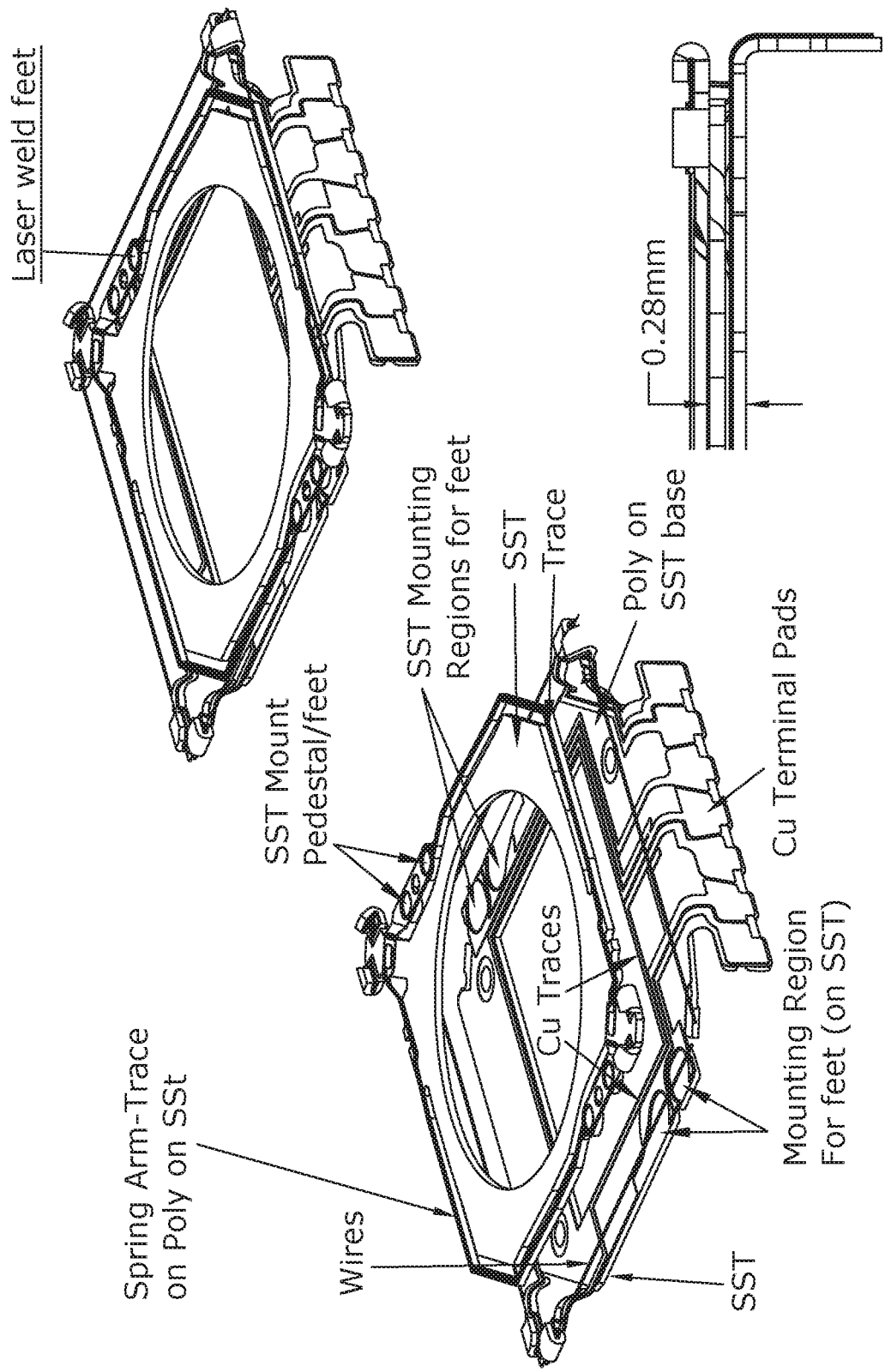
Figure 12:
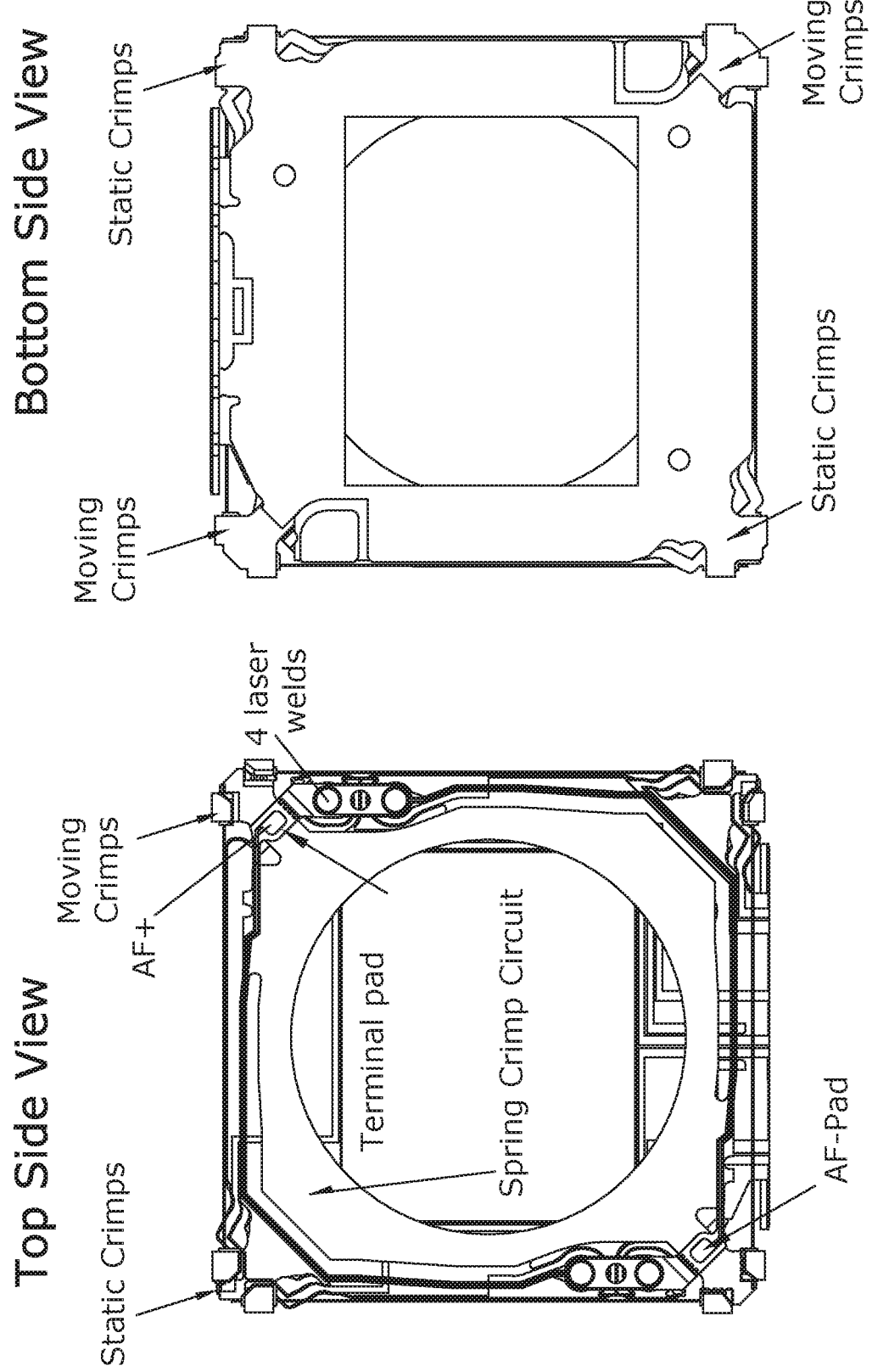
Figure 13:
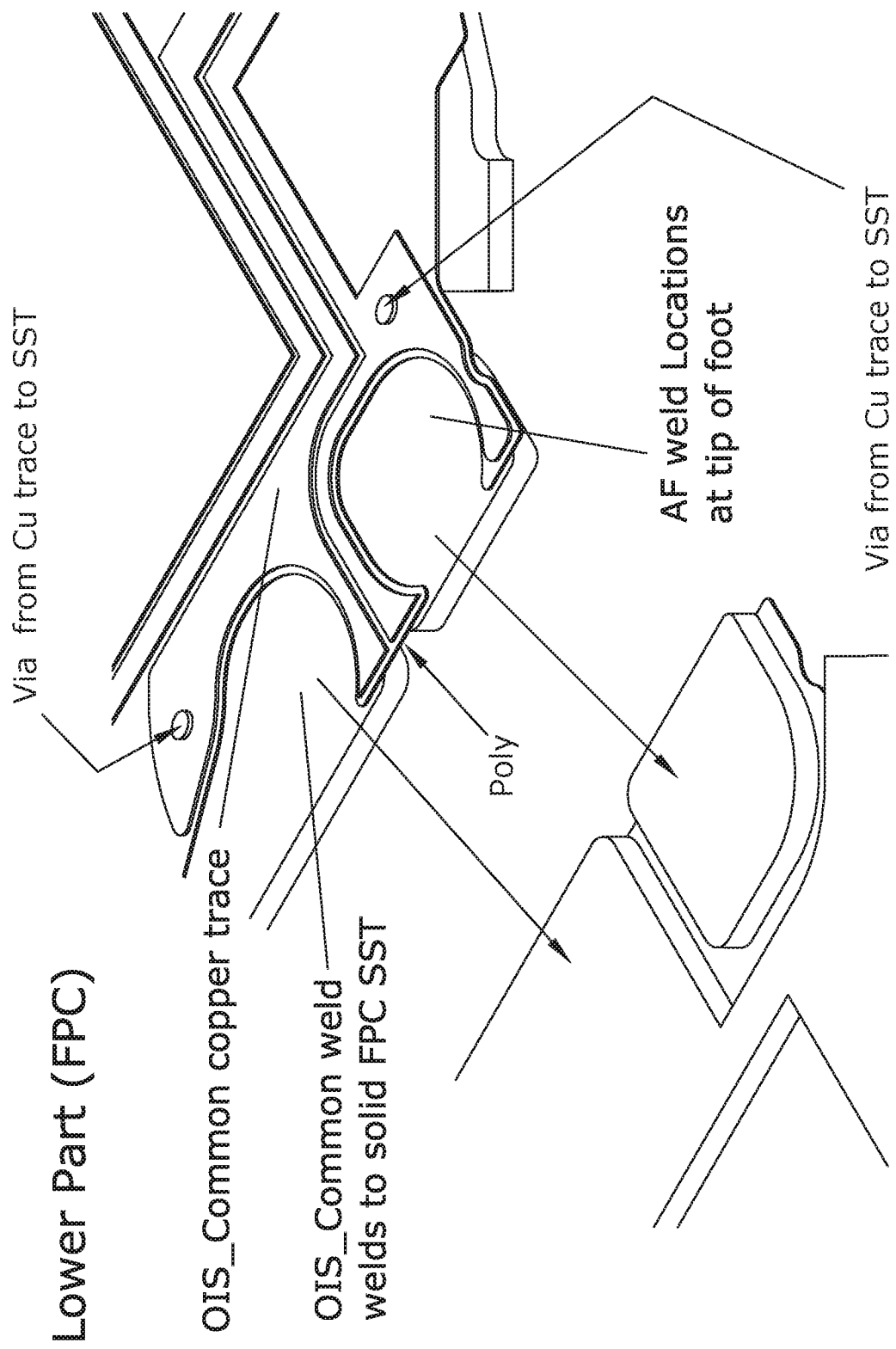
Figure 14:
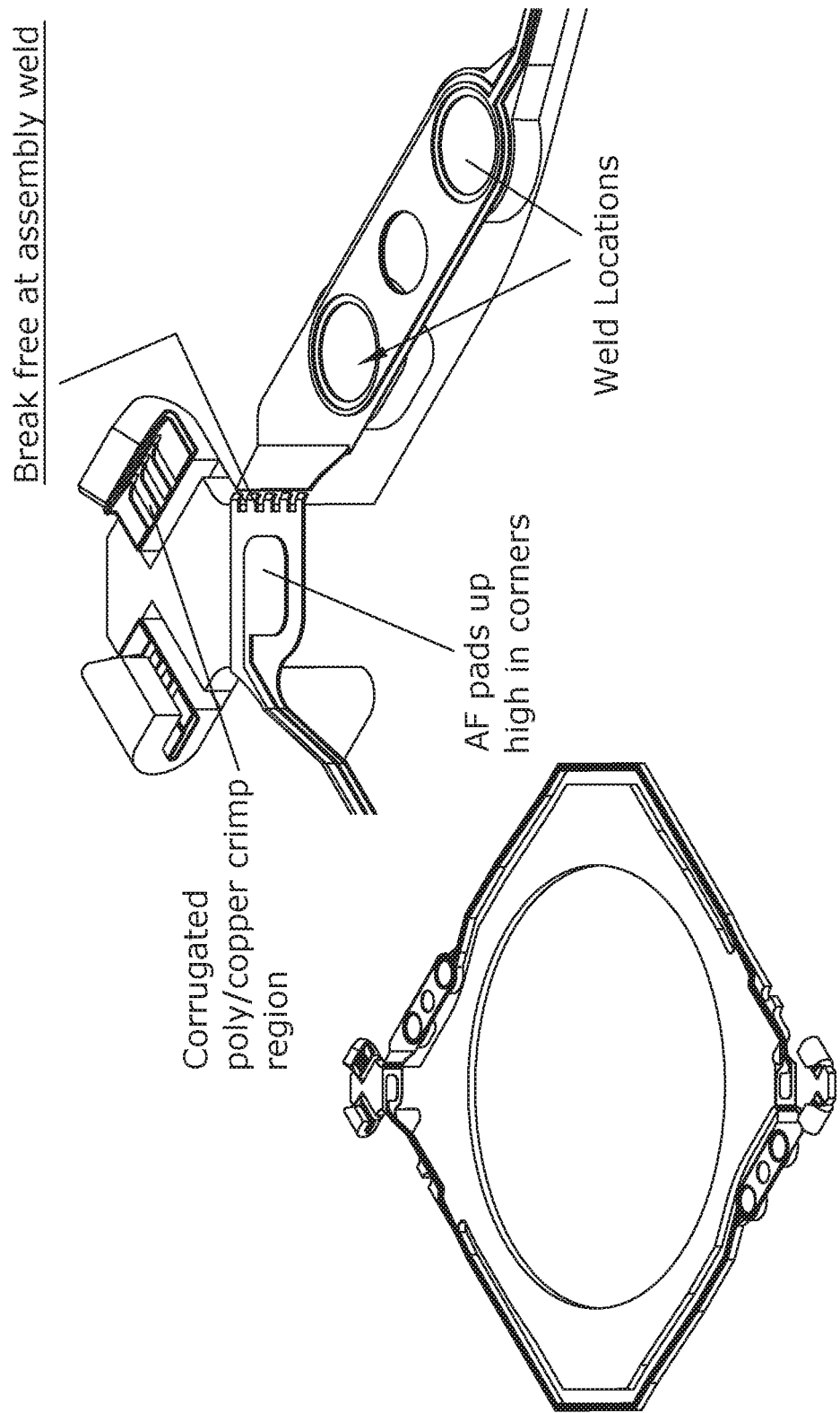

As perhaps best shown in FIGS. 1A and 7, the mount regions 74 of the moving member flexure arms 62 are mechanically attached to the mount regions 33 and 35 of the support member 12. The traces 76 on the flexure arms 62 are electrically connected to the associated traces 18 on the support member 12. In embodiments, the mechanical connections are made by welds between the pad portions 84 and 90 in the base layer 68 of the moving member 14 and the corresponding pad portions 44 and 48 in the base layer 16 of the support member 12. The welds can, for example, be made through the openings in the traces 76 at the pad portions 84 and 90. The welds also enable electrical connections between the pad portions 84 and 90 of the moving member 14 and the corresponding pad portions 44 and 48 of the support member 12. By these electrical connections, the metal base layer 68 of the moving member 14, and thereby the moving crimps 70, are electrically connected in common to an associated trace 18 (i.e., such as 18b through via 50). Similarly, each flexure arm trace 76 is electrically connected to an associated trace 18 (i.e., such as 18a through via 46). Other embodiments of the disclosure (not shown) have other structures for mechanically mounting the flexure arms 62 to the support member 12, and/or for electrically connecting the traces 76 on the flexure arms to the associated traces 18 on the support member. In the illustrated embodiment, conductive metal regions 94 are located directly on the metal base layer 68 of the moving member 14 at the crimps 70 (i.e, there is no dielectric or other insulating material between the conductive metal regions and the metal base layer) to enhance the electrical connections between the metal base layer and the SMA wires 15 engaged by the crimps.

As described in greater detail below, the support member 12 and moving member 14 can be formed from additive and/or subtractive processes. Base layers 16 and/or 68 are stainless steel in embodiments. In other embodiments the base layers 16 and/or 68 are other metals or materials such as phosphor-bronze. Traces 18 and 76, terminals 30 and contact pads 32 can be formed from copper, copper alloys or other conductors. Polyimide or other insulating materials can be used as the dielectric 20 and 78. Other embodiments of the support member 12 and/or moving member 14 (not shown) have more or fewer traces 18 and 76, and the traces can be arranged in different layouts. Structures other than crimps 24, such as welds, can be used to attach the SMA wires 15 to the base layer 16. Other embodiments of the disclosure (not shown) have more or fewer crimps 24 and 70, and the crimps can be at different locations on the support member 12 and moving member 14, respectively.

FIGS. 8-14 are annotated illustrations of an improved camera lens suspension assembly in accordance with embodiments of the disclosure. The suspension assembly has two primary components—a base or support member (referred to in FIGS. 8-14 as a static FPC (flexible printed circuit)), and a moving/spring member (referred to in the FIGS. 8-14 as a spring crimp circuit). Both the static FPC (base member) and the spring crimp circuit (moving member) are integrated lead structures in the illustrated embodiments, in that they have electrical structures such as leads, contact pads and terminals (e.g. in a copper "Cu" or copper alloy layer) formed on the base metal (stainless steel (SST)) in the illustrated embodiments). A layer of insulator (e.g., polyimide or "poly") separates the portions of the electrical structures that are to be electrically isolated from the SST (other portions of the Cu layer are connected to or directly on the SST layer). At some locations, the electrical structures can be electrically connected to the SST layer by electrical connections (e.g., "vias") extending from the Cu trace or lead layer to the SST layer through openings in the poly layer. In embodiments, a lens can be mounted to the spring crimp circuit. In yet other embodiments, an autofocus system supporting the lens can be mounted to the spring crimp circuit.

As noted above, the static FPC and spring crimp circuit can be formed from overlaying layers of base metal (e.g., a spring metal such as SST), poly and Cu (i.e., the "trace" layer). An insulating covercoat can be applied over all or portions of the Cu. Corrosion resistant metals such as gold (Au) and/or nickel (Ni) can be plated or otherwise applied to portions of the trace layer to provide corrosion resistance. Conventional additive deposition and/or subtractive processes such as wet (e.g., chemical) and dry (e.g., plasma) etching, electro plating and electroless plating and sputtering processes in connection with photolithography (e.g., use of patterned and/or unpatterned photoresist masks), as well as mechanical forming methods (e.g., using punches and forms) can be used to manufacture the static FPC and spring crimp circuit in accordance with embodiments of the disclosure. Additive and subtractive processes of these types are, for example, known and used in connection with the manufacture of disk drive head suspensions, and are disclosed generally in the following U.S. patents, all of which are incorporated herein by reference for all purposes: Bennin et al. U.S. Pat. No. 8,885,299 entitled Low Resistance Ground Joints for Dual Stage Actuation Disk Drive Suspensions, Rice et al. U.S. Pat. No. 8,169,746 entitled Integrated Lead Suspension with Multiple Trace Configurations, Hentges et al. U.S. Pat. No. 8,144,430 entitled Multi-Layer Ground Plane Structures for Integrated Lead Suspensions, Hentges et al. U.S. Pat. No. 7,929,252 entitled Multi-Layer Ground Plane Structures for Integrated Lead Suspensions, Swanson et al. U.S. Pat. No. 7,388,733 entitled Method for Making Noble Metal Conductive Leads for Suspension Assemblies, Peltoma et al. U.S. Pat. No. 7,384,531 entitled Plated Ground Features for Integrated Lead Suspensions.

The static FPC is a one-piece member in the illustrated embodiment, and has two static crimps (attachment structures) on each of two diagonal corners of the member (4 static crimps in total). A terminal pad section includes terminal pads in the trace layer that are connected to traces that extend over the surface of the member. As shown for example, a separate trace extends to each of the four static crimps. At each of the static crimps is an electrical contact or terminal formed by the trace and poly layers. Formed dimples extending from the upper surface of the static FPC member engage the back surface of the spring crimp circuit member, and function as sliding interface bearings to enable low friction movement of the spring crimp circuit member with respect to the static FPC. The traces on the static FPC also couple terminal pads to electrical pad locations on the static FPC that are electrically and mechanically coupled to the spring crimp circuit member (e.g., to provide electrical signals to an auto focus (AF) assembly and to provide a common or ground signal path to the SST layer of the spring crimp circuit member. Vias couple the respective traces on the static FPC to portions of the SST layer that are connected to the feet.

The spring crimp circuit is a one-piece member in the illustrated embodiments and includes a central member for supporting a lens or auto focus system, and one or more spring arms (two in the illustrated embodiment) extending from the central member. The spring crimp member has two moving crimps on each of two diagonal corners of the member (4 moving crimps in all). Pedestals or feet in the SST layer (on the ends of the spring arms opposite the central member in the illustrated embodiment) are configured to be welded or otherwise attached to corresponding locations on the static FPC. Traces on the spring crimp member are configured to be electrically coupled to traces on the static FPC (e.g., through the feet) and couple signals to terminal pads such as the auto focus (AF) terminal pads. In the illustrated embodiment, the SST layer of the spring crimp circuit is used as a signal path to the ends of the SMA wires attached to the moving crimps. Electrical connection between the corresponding terminal pad and trace on the static FPC to the SST layer of the spring crimp circuit is provided by the connection between the feet of the spring arms and the SST layer of the static FPC (i.e., the SST layers of the two members are electrically coupled, and are at a common ground potential in embodiments).

Suspensions in accordance with the embodiments having traces on the moving member flexure arms offer important advantages. They can for example, be efficiently fabricated and assembled. The traces are effective structures for coupling electrical signals to structures mounted to the plate or other portions of the moving member.

Figure 4A:
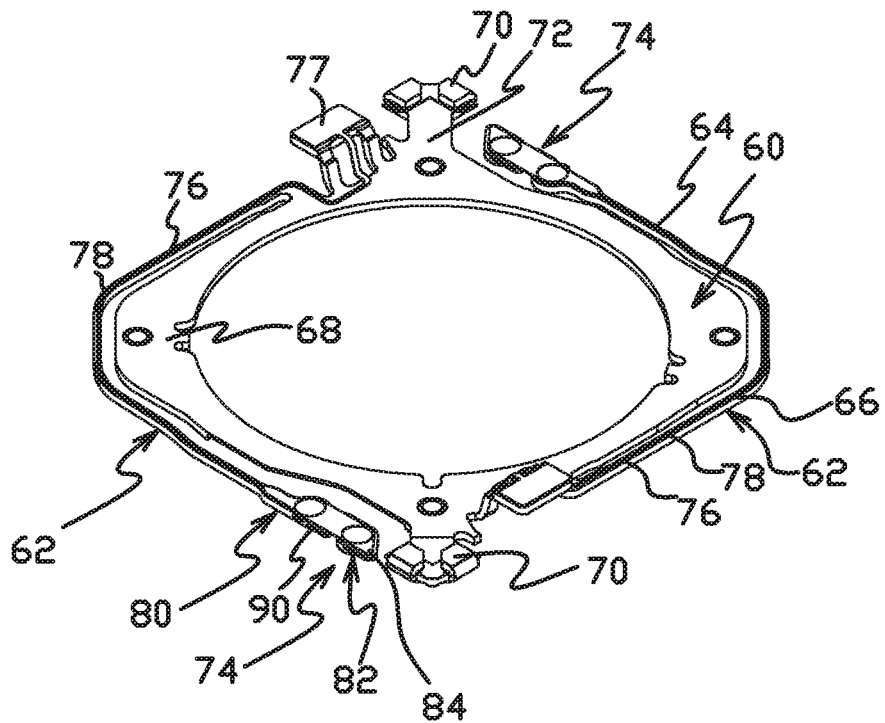
FIG. 4A is a top isometric view of the moving member of the suspension shown in FIG. 1A.
Figure 4B:
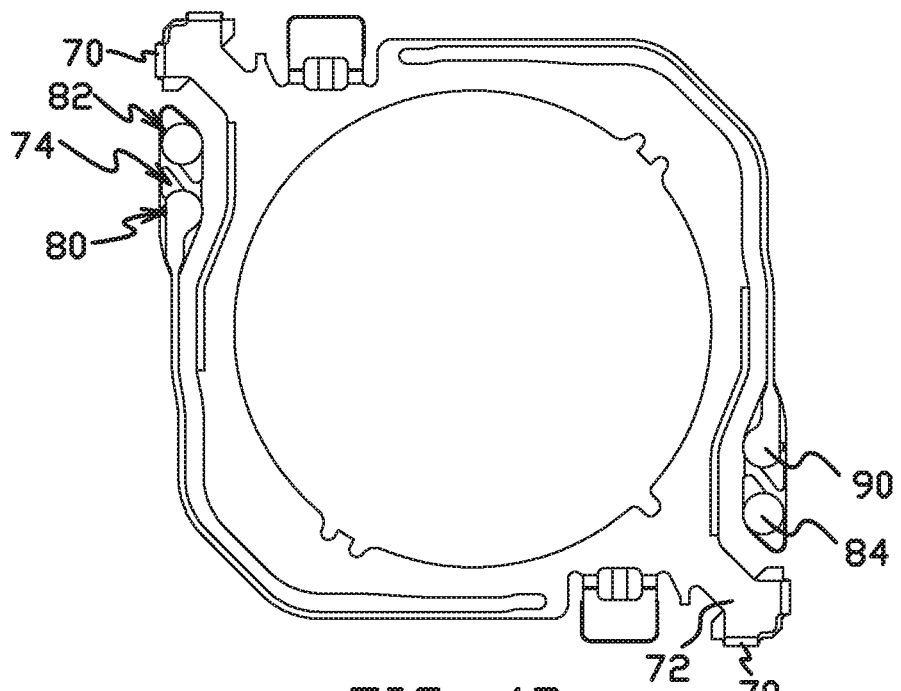
FIG. 4B is a bottom plan view of the moving member shown in FIG. 4A.
Figure 5:
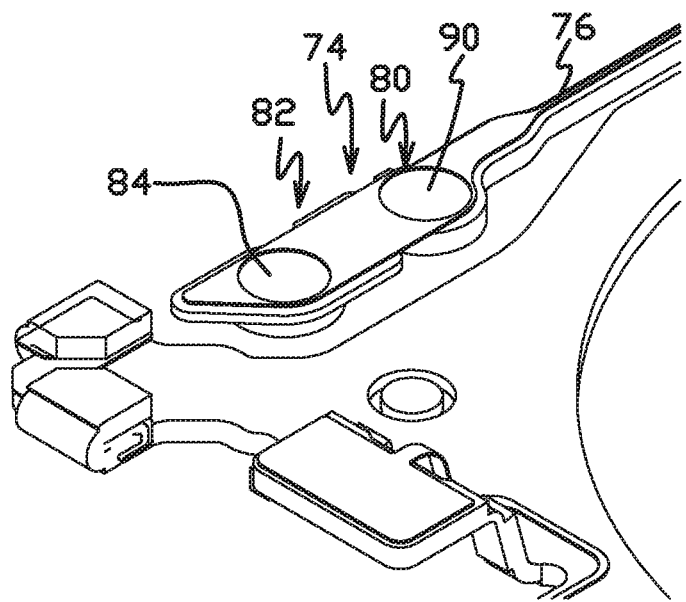
FIG. 5 is a detailed top isometric view of a flexure arm mount region and a wire attach of the moving member shown in FIG. 4A.
Figure 6:
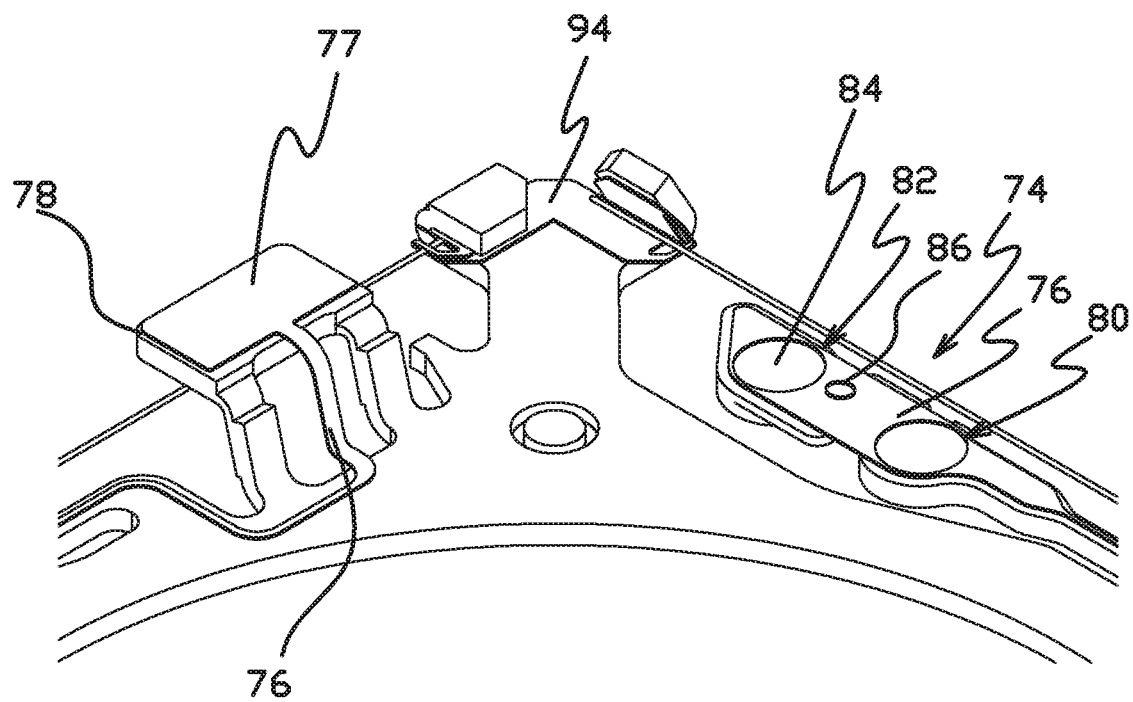
FIG. 6 is a detailed top isometric view of a flexure arm mounting region and a wire attach of the moving member shown in FIG. 4A.

As stated above, the suspension assembly 10 includes SMA wires 15 that extend between the support member 12 and the moving member 14. The SMA wires 15 are coupled to the support member 12 and the moving member 14 using attachment structures. The attachment structures may include crimps, for example, the crimps 24, 70 depicted in FIGS. 2A-2B and 4A-4B, respectively. In embodiments, the support member 12 and the moving member 14 each include attachment structures on two diagonal corners, as shown in FIGS. 1B and 4B, respectively.

Figure 15B:
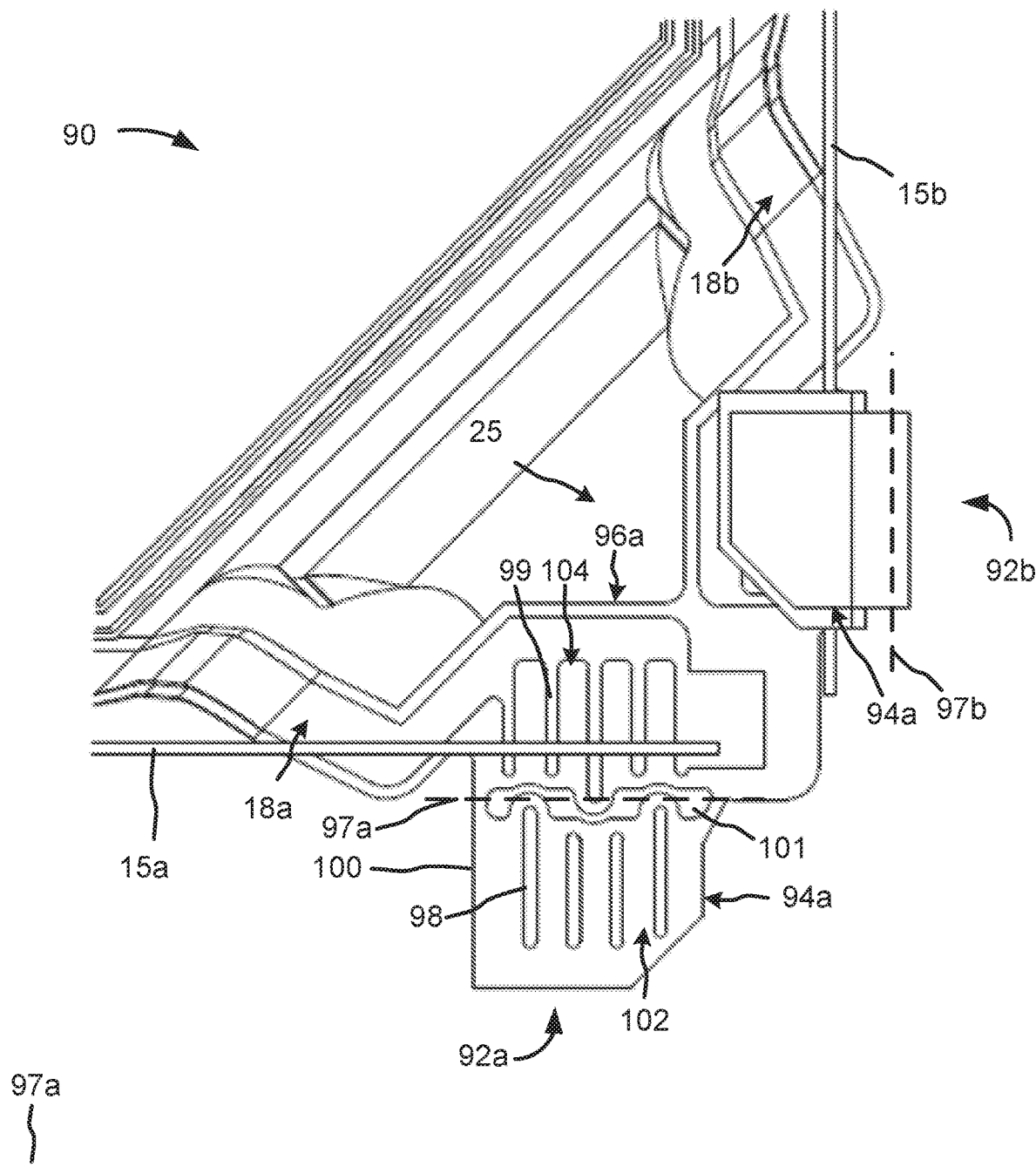
FIG. 15B is a top plan view of the attachment structure shown in FIG. 15A.

FIGS. 15A-15B illustrate an attachment structure 91, in accordance with embodiments of the disclosure. In embodiments, the attachment structure 91 is incorporated into one or more diagonal corners of the support member 12. For example, the attachment structure 91 may be incorporated into two diagonal corners of the support member 12. Furthermore, the attachment structure 91 is configured to crimp one or more SMA wires 15 such as SMA wires 15*a* and 15*b* using one or more crimps 92*a*, 92*b*.

As illustrated, the attachment structure 91 is unitary with the base layer 16 and includes two crimps 92*a*, 92*b*. The two crimps 92*a*, 92*b* are formed on a ledge 25 in the base layer 16 at a level spaced (e.g., in a z-direction) from the major planar surface portion 26 (shown in FIGS. 2A and 2B). As illustrated, each crimp 92*a*, 92*b* includes a first portion 94*a*, 94*b* and a second portion 96*a*, 96*b*. The first portions 94*a*, 94*b* are configured to be folded substantially along respective axes 97*a*, 97*b* to crimp the first portions 94*a*, 94*b* and second portions 96*a*, 96*b* together. Once crimped together, the first portions 94*a*, 94*b* and second portions 96*a*, 96*b* hold SMA wires 15*a*, 15*b* in place as illustrated by crimp 92*b* and SMA wire 15*b*. As illustrated above in FIGS. 1A and 1B, the other ends of the SMA wires 15 are coupled to the moving member 14.

As illustrated, the first portions 94*a*, 94*b* and second portions 96*a*, 96*b* are a unitary piece of material. However, in embodiments, the first portions 94*a*, 94*b* and second portions 96*a*, 96*b* may be non-unitary and coupled together using an adhesive, a weld, a solder joint and/or the like.

As illustrated by crimp 92*a*, the first portion 94*a* of crimp 92*a* includes a set of conductive traces 98 and the second portion 96*a* includes a set of conductive traces 99. In embodiments, the conductive traces 99 project from the conductive trace 18*a*. Crimp 92*b* may have a similar configuration. As described above, the conductive traces 18*a* and 18*b* may be coupled to a separate terminal pad 30*a* and 30*b*, respectively. Furthermore, one or more layers of dielectric 100 are located between the conductive traces 98, 99 and the base layer 16 to electrically insulate the traces 98, 99 from the base layer 16. In embodiments, the dielectric 100 located between the conductive traces 98, 99 may be a single piece of dielectric; or, alternatively, the dielectric 100 located between the conductive traces 98, 99 may have a break along the axes 97*a*, 97*b*, respectively, (as shown in FIG. 15B for crimp 92*a*) to aid in folding the first portions 94*a*, 94*b* along the axes 97*a*, 97*b*. Furthermore, in embodiments, the length of the traces 98, 99 may be staggered, as shown in FIG. 15B. Staggering the lengths of the traces 98, 99 may reduce the likelihood that the SMA wire 15 contacts the bend between the first and second portions 98, 99 which may short the SMA wire 15 to the base layer 16. In embodiments, the traces 98, 99 may be formed from copper, copper alloys or other conductors. In embodiments, an insulating covercoat can be applied over all or portions of traces 98, 99. Corrosion resistant metals such as gold (Au) and/or nickel (Ni) can be plated or otherwise applied to portions of the traces 98, 99 to provide corrosion resistance. Polyimide or other insulating materials may be used as the dielectric 100.

Since the layer of dielectric 100 isolates the traces 98, 99 from the base layer 16 and since the conductive traces 18*a* and 18*b* may be coupled to separate terminal pads 30*a* and 30*b*, respectively, each SMA wires 15*a* and 15*b* may be actuated independently in order to move and control the moving member 14. Due to this configuration, the base layer 16 may be one piece. In contrast, conventional embodiments may require a base layer that is split into four pieces so that each SMA wire 15 can be actuated independently of one another. Since the base layer 16 may be made of one piece in the embodiments presented herein, the base layer 16 may have more structural integrity and rigidity than a base layer that is used in conventional embodiments.

As illustrated, the traces 98 include spaces 102 therebetween and the traces 99 also include spaces 104 therebetween. In embodiments, one or more of the spaces 102 align with one or more of the traces 99 and one or more the spaces 104 align with one or more of the traces 98. In embodiments, the traces 98, 99 may include elongate features, for example, fingers, slices, members and/or the like. The traces 98 and traces 99 are offset with respect to each other, for example, in an interwoven, interleaved, staggered and/or the like relationship so that the traces 98 are located in the spaces 104 and the traces 99 are located in the spaces 102 when the first and second portions 94*a*, 96*a* are crimped together. Crimp 92*b* may include a similar configuration of traces and spaces as crimp 92*a*. As stated above, in embodiments, the conductive traces 99 may project from the conductive trace 18*a*, as illustrated in FIG. 15A. As such, when the first portions 94*a*, 94*b* are crimped together with the second portions 96*a*, 96*b*, the SMA wires 15 are bent around the conductive traces 98, 99, as shown in FIG. 16.

Figure 16:
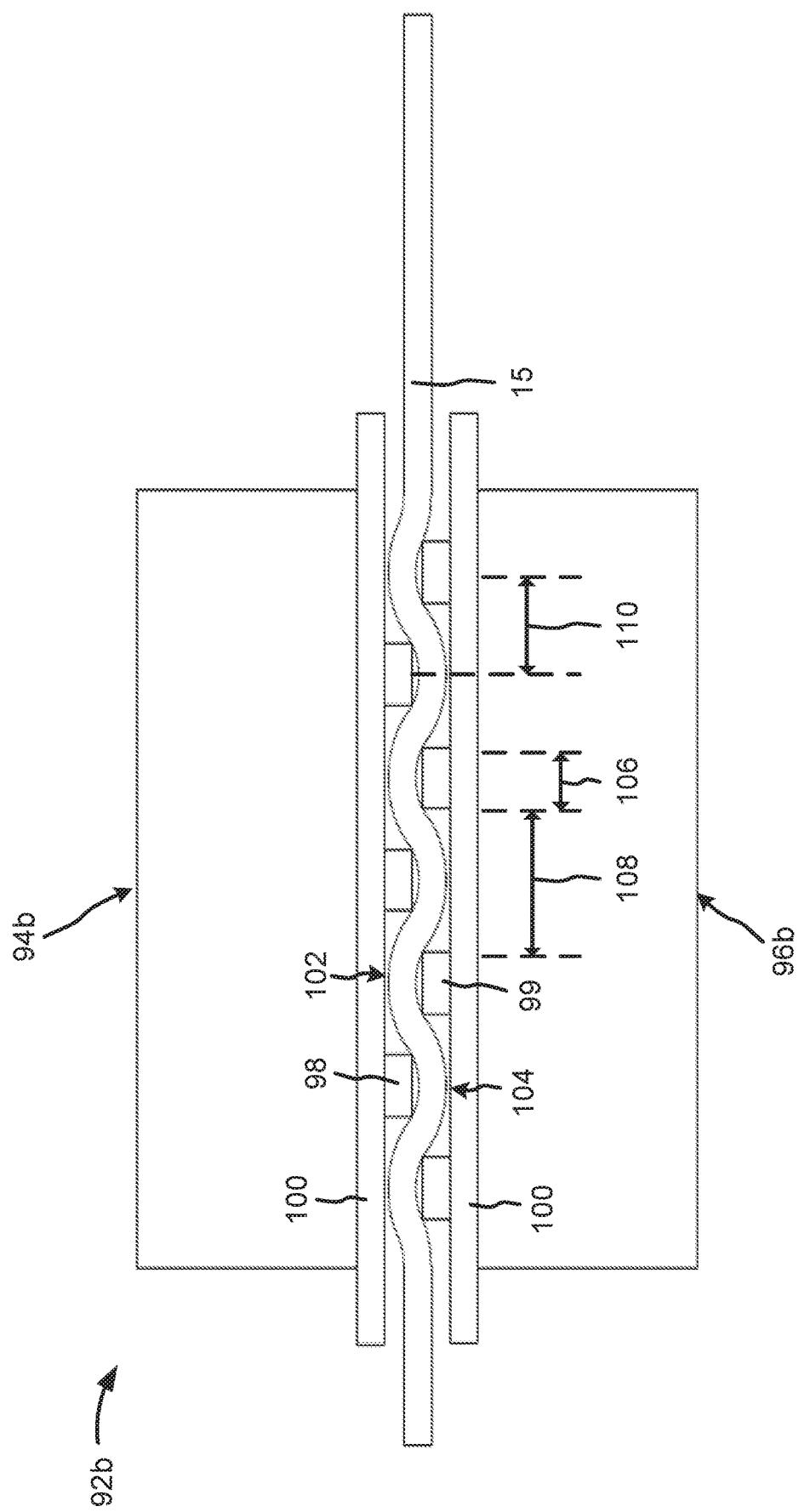
FIG. 16 illustrates a cross-sectional view of a crimp that can be incorporated into the attachment structure shown in FIGS. 15A-15B.

FIG. 16 illustrates a cross-sectional view of crimp 92*b*. In embodiments, crimp 92*a* may have a similar configuration when the first and second portions 94*a*, 96*a* of crimp 92*a* are crimped together. As shown, the conductive traces 98, 99 provide a force perpendicular to the longitudinal axis of the SMA wire 15 when the first portion 94*b* and second portion 96*b* are crimped together. As such, the SMA wire 15 is deformed into the spaces 102, 104 by the traces 98, 99. Due to this configuration, the SMA wire 15 may be held more securely in place by the crimp 92*b* than if the SMA wire 15 was held in place by two flat pieces of material.

In embodiments, the width 106 of the conductive traces 98, 99, the width 108 of the spaces 102, 104 and the distance 110 between a conductive trace 98 and a conductive trace 99 may vary, depending on the flexibility of the SMA wire 15. For example, if a first SMA wire 15 is stiffer than a second SMA wire 15 and the first SMA wire 15 is being used, then the width 108 of the spaces 104 and the distance 110 between the conductive traces 98, 99 may be greater than if the second SMA wire 15 was being used. As another example, if the first SMA wire 15 is being used then the width 106 of the traces 98 may be smaller than if the second SMA wire 15 is being used, in order to provide a more localized perpendicular force on the SMA wire 15.

In embodiments, after the one or more SMA wires 15 are crimped between a crimp 92*a*, 92*b*, the SMA wire 15 may need to be cut from a spool of SMA wire 15. Additionally or alternatively, excess SMA wire 15 that may extend beyond an edge of a crimp 92*a*, 92*b* may need to be removed. In embodiments, the SMA wire 15 may be sheared using a tool that presses the wire in the base layer 16 and/or the dielectric 100 that separates the traces 18 from the base layer 16. In some cases, however, this may cause the SMA 15 wire to contact, and short to, the base layer 16. As such, in embodiments, a pad may be placed on top of the dielectric and under the SMA wire 15.

Figure 17:
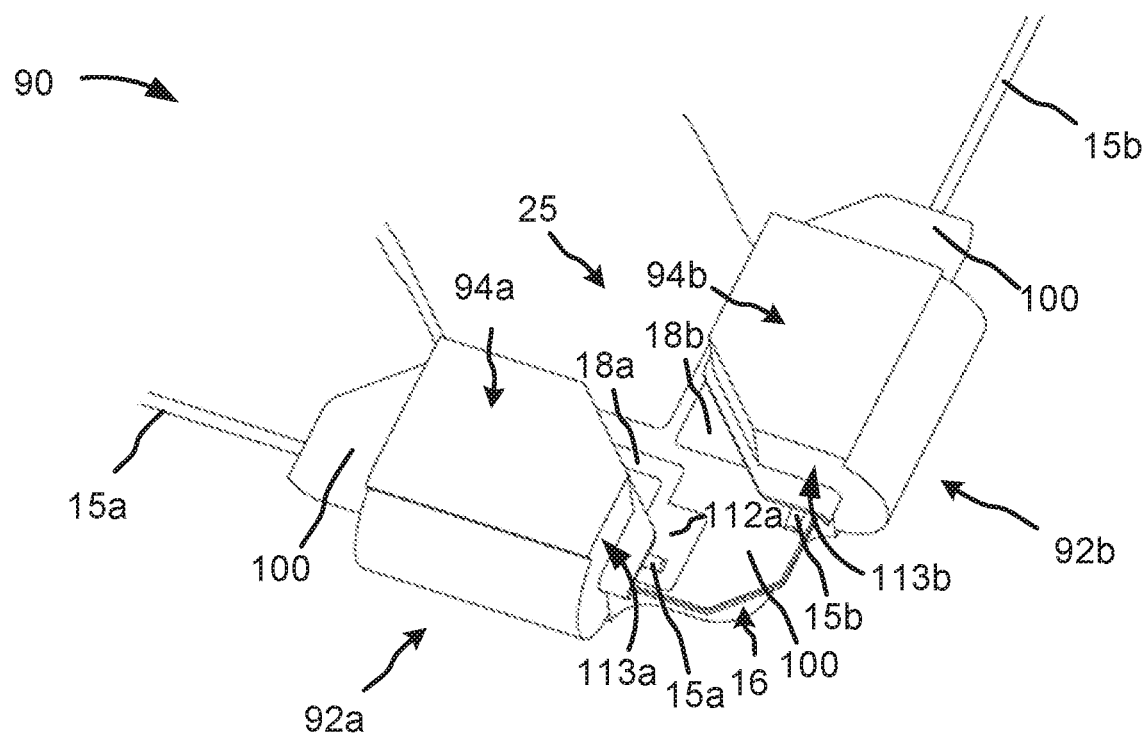
FIG. 17 illustrates a top isometric view of an attachment member including an illustrative cutting pad.
Figure 18:
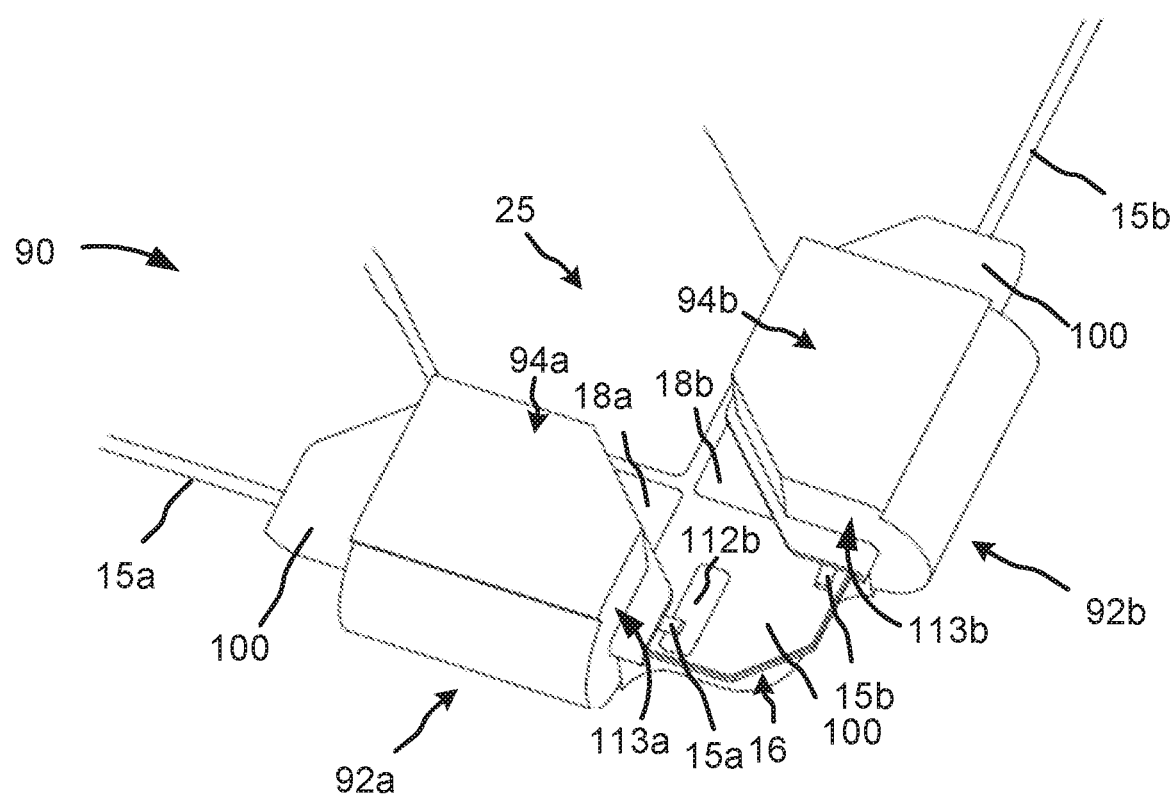
FIG. 18 illustrates a top isometric view of an attachment member including another illustrative cutting pad.

FIGS. 17 and 18 illustrate an attachment member including illustrative cutting pads 112*a*, 112*b*, respectively, in accordance with embodiments of the disclosure. As stated above, the cutting pads 112*a*, 112*b* may be used to cut the SMA wire 15 from a spool and/or cut any excess SMA wire 15 that is not needed. This may reduce the likelihood that the SMA wire 15 is shorted to the base layer 16. In embodiments, the pads 112*a*, 112*b* may be located on the ledge 25 in a position proximal to edges 113*a*, 113*b* of the crimps 92*a*, 92*b*, respectively. The pads 112*a*, 112*b* may be positioned outside of the crimps 92a, 92b so that the pads 112a, 112b are exposed when the crimps 92a, 92b are crimped and/or the pads 112a, 112b may include a portion that extends beyond the edges 113a, 113b of the crimps 92a, 92b so that the pads 112a, 112b are exposed when the crimps 92a, 92b are crimped.

In embodiments, the pads 112a, 112b may be made of a metal. For example, the pads 112a, 112b may be made of the same material as the traces 18, such as copper, copper alloys or other conductors. As such, the pad 112a may be coupled to the traces 18, as shown in FIG. 17. Alternatively, the pad 112b may be decoupled from the traces 18, as shown in FIG. 18. In other embodiments, the pads 112a, 112b may be made of a non-metal material and/or include a cover coat over the pad.

Figure 19:
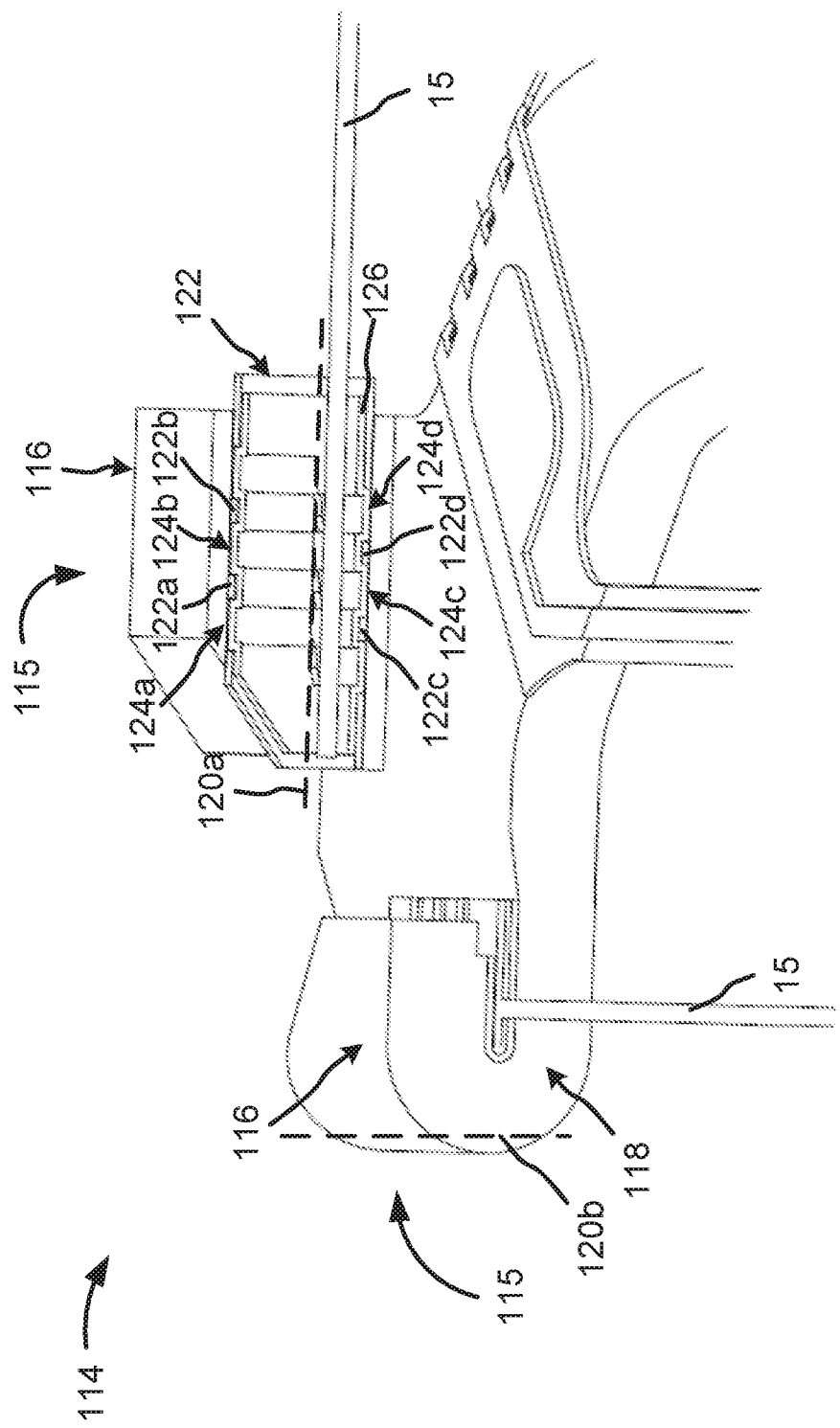
FIG. 19 illustrates an attachment structure that can be incorporated into the moving member.

FIG. 19 illustrates an attachment structure 114 that can be incorporated into the moving member 14, in accordance with embodiments of the disclosure. As illustrated, the attachment structure 114 includes two crimps 115. The two crimp 115 are unitary with the plate 60 and each crimp 115 includes a first portion 116 and a second portion 118. The first portions 116 are configured to be folded substantially along a respective axis 120a, 120b, in order to crimp the first portions 116 and the second portions 118 together. When the first and second portions 116, 118 are crimped together, they hold an SMA wire 15 in place. As illustrated above in FIGS. 1A and 1B, the other ends of the SMA wire 15 is coupled to the support member 12.

The first and second portions 116, 118 include elongate features 122a-122d disposed on the plate 60. Furthermore, the elongate features 122a-122d include spaces 124a-124d therebetween. In embodiments, one or more of the spaces 124a-124d align with one or more of the elongate features 122a-122d. In embodiments, the elongate features 122a-122d may be, for example, fingers, slices, members and/or the like. The elongate features 122a, 122b and elongate features 122c, 122d are offset with respect to each other, for example, in an interwoven, interleaved, staggered and/or the like relationship so that the elongate features 122a, 122b are located in the spaces 124c, 124d and the elongate features 122c, 122d are located in the spaces 124a, 124b when the first and second portions 116, 118 are crimped together. As such, when the first portion 116 is crimped together with the second portions 118, the elongate features 122a-122d provide a force perpendicular to the longitudinal axis of the SMA wire 15. As such, the SMA wire 15 is deformed into the spaces 124a-124d by the elongate features 122a-122d. Due to this configuration, the SMA wire 15 may be held more securely in place by the crimp 115 than if the SMA wire 15 was held in place by two flat pieces of material.

In embodiments, the elongate features 122a-122d may be made of a conductive material or a dielectric. For example, the elongate features 122a-122d may be formed from copper, copper alloys or other conductors, or a polyimide or other insulating materials.

In embodiments, a conductive layer 126 may be disposed on the elongate features 122. However, since portions of the elongate features 122 include spaces 124a-124, the SMA wire 15 may be electrically coupled to the plate 60 via the conductive layer 126 when the elongate features 122a-122d are made of a dielectric. Similar to the width 108 of the spaces 104 and the distance 110 between the conductive traces 98, 99 discussed above, the width of the elongate features 122a-122d and the wide of the spaces 124a-124d may be varied, depending on the flexibility of the SMA wire 15. In embodiments, the conductive layer 126 may be formed from copper, copper alloys or other conductors. In embodiments, an insulating covercoat can be applied over all or portions of the conductive layer 126. Corrosion resistant metals such as gold (Au) and/or nickel (Ni) can be plated or otherwise applied to portions of the conductive layer 126 to provide corrosion resistance. Polyimide or other insulating materials may be used as the elongate features 122.

Figure 20A:
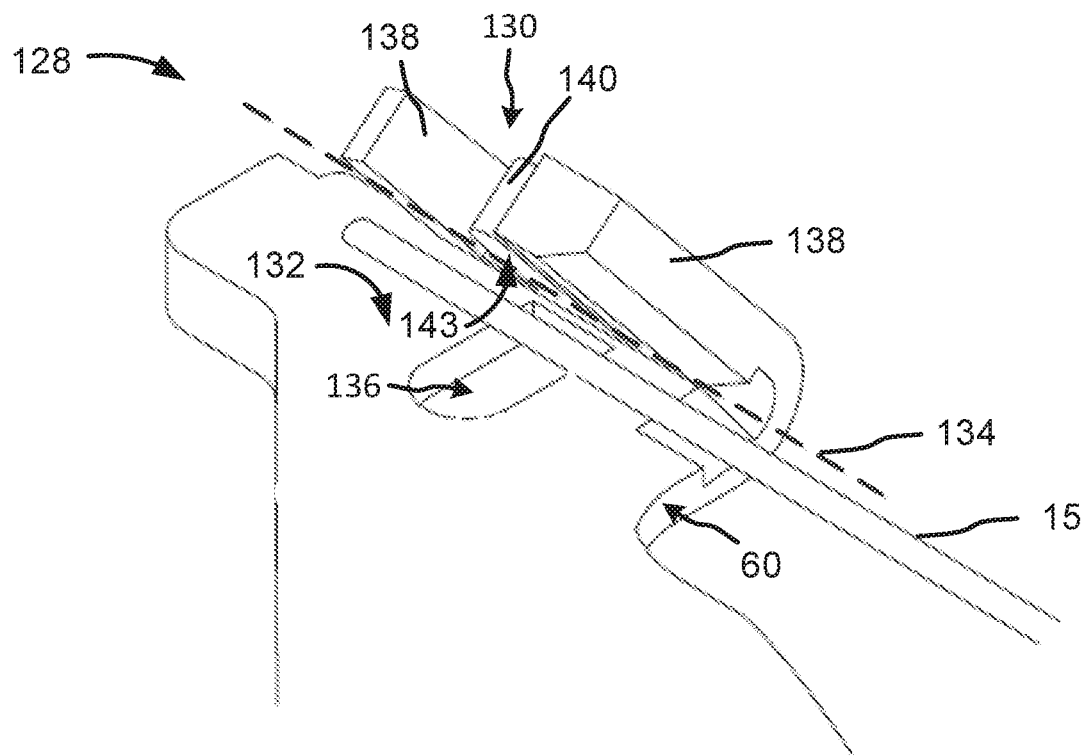
FIGS. 20A-20C illustrate an embodiment of a crimp that can be incorporated into attachment structure disclose herein.
Figure 20B:
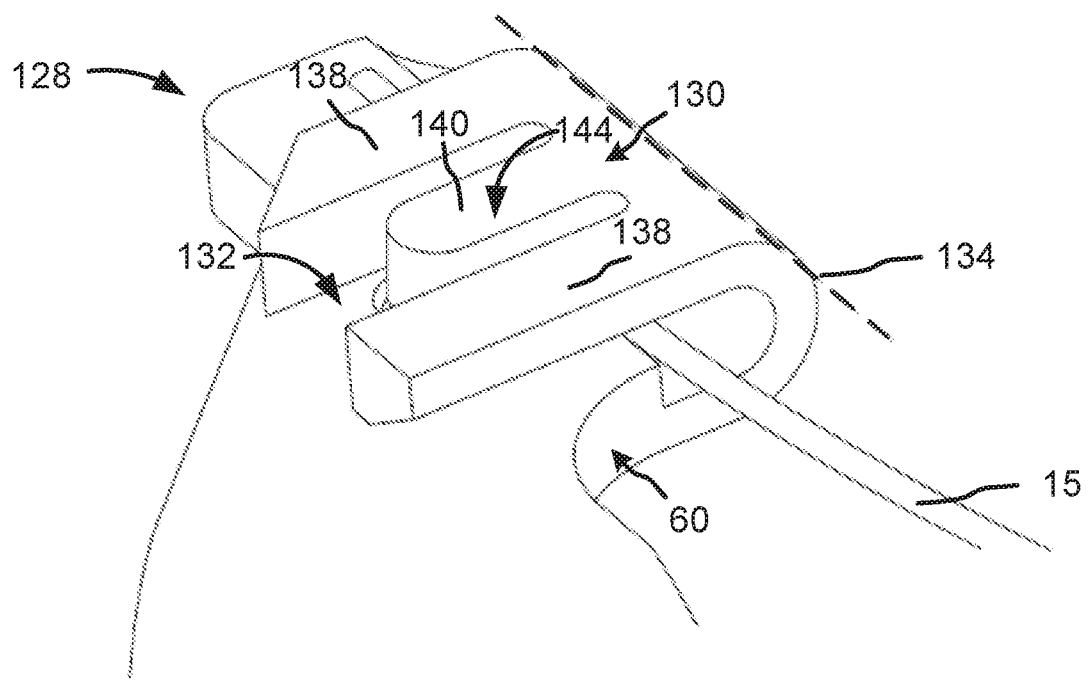
Figure 20C:
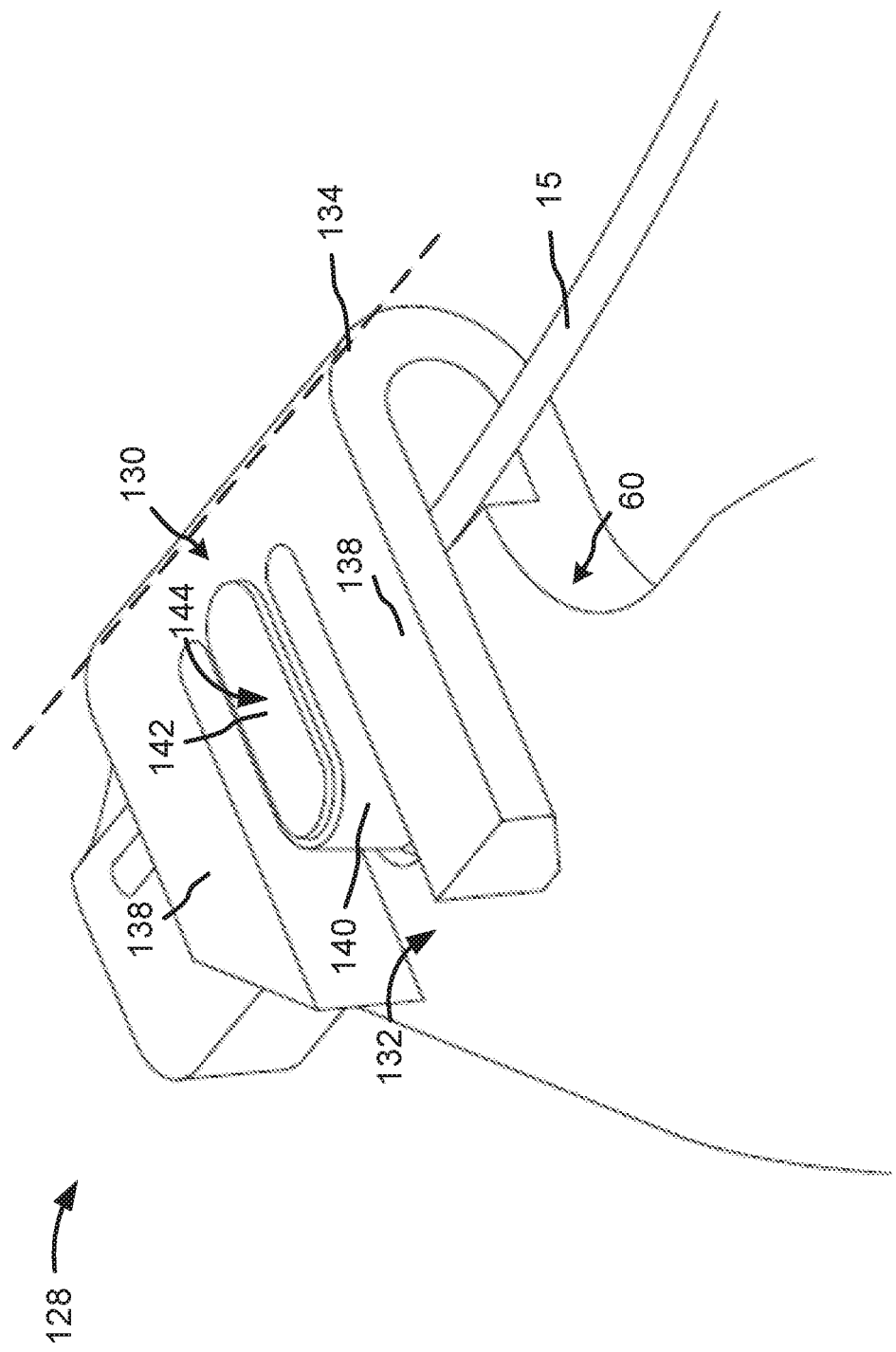
Figure 21:
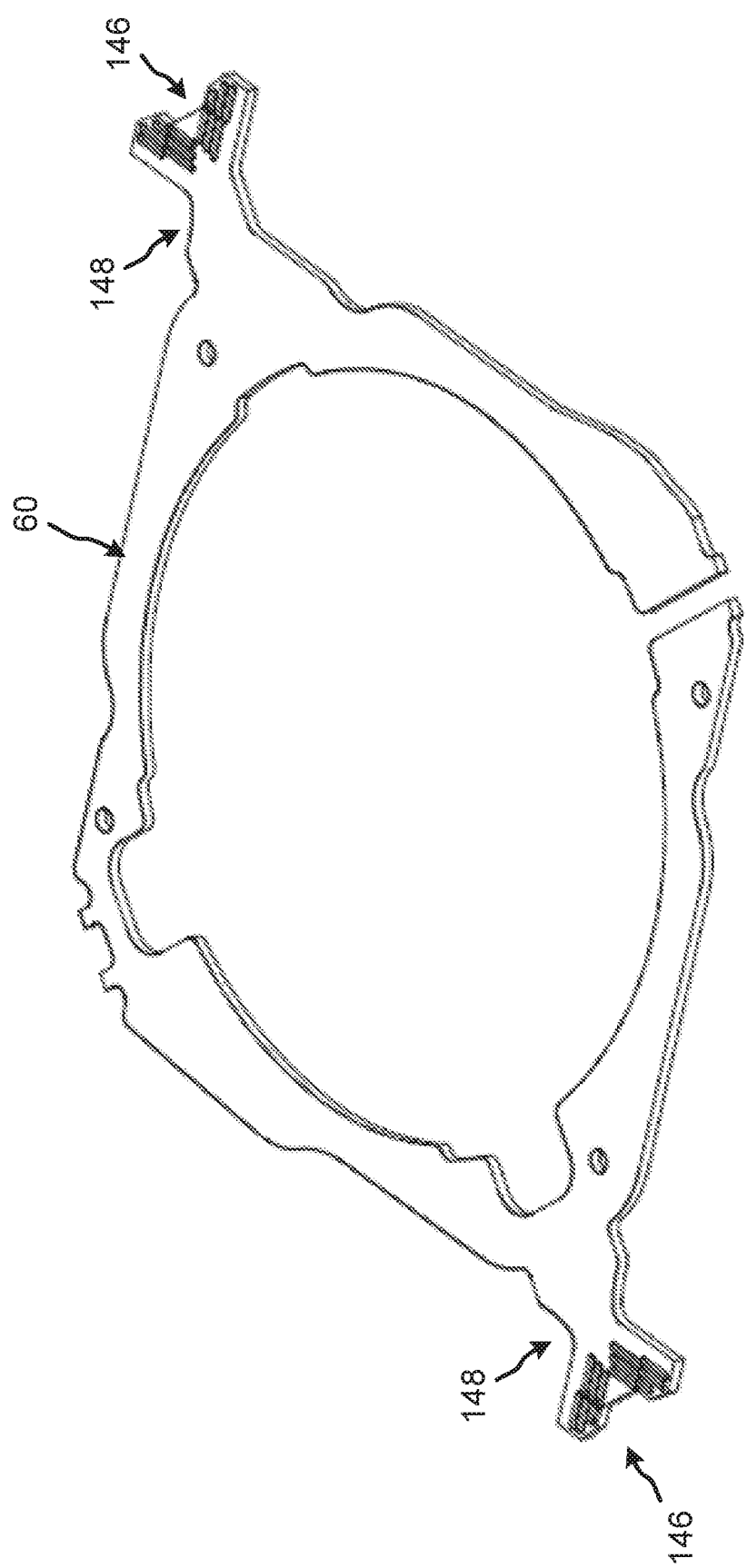
FIG. 21 depicts a base layer of a moving member, in accordance with the embodiments of the disclosure.

FIGS. 20A-20C illustrate another embodiment of a crimp 128 that can be incorporated into one or more of the attachment structures discussed above. In embodiments, multiple crimps 128 may be incorporated into each of one or more diagonal corners of the moving member 14. For example, four crimps 128, two crimps 128 for each diagonal corner, may be incorporated into two diagonal corners of the moving member 14, as shown in FIG. 21.

As illustrated, the crimp 128 is unitary with the plate 60 and includes a first portion 130 and a second portion 132. The first portion 130 is configured to be folded substantially along an axis 134 in order to crimp the first and second portions 130, 132 together. When the first and second portions 130, 132 are crimped together, they hold an SMA wire 15 in place as illustrated in FIGS. 20B and 20C. As illustrated above in FIGS. 1A and 1B, the other ends of the SMA wire 15 is coupled to the support member 12.

In the embodiment, the crimp 128 includes a recess 136. The recess 136 may be etched out of the second portion 132 of the plate 60, as illustrated in FIG. 20A. Furthermore, the first portion 130 may include a plurality of elongate members 138, 140 which include spaces therebetween. While three elongate members 138, 140 are illustrated, alternative embodiments may include more or fewer elongate members 138, 140. When the first and second portions 130, 132 are crimped together, at least one of the elongate members, for example, elongate member 140, extends into the recess 136. While only one elongate member 140 is shown extending into a recess 136, in other embodiments, other elongate members may extend into respective recesses or into the same recess. Furthermore, when the first and second portions 130, 132 are crimped together, the elongate members 138 may contact the top of the second portion 132, as shown in FIGS. 20B and 20C. In embodiments, the edges of the recess 136 and the edges of the elongate members 138, 140 may be rounded so that the SMA wire 15 is less likely to be damaged when the SMA wire 15 is forced into the recess 136 by the elongate member 140.

Since the elongate member 140 extends into the recess 136, the elongate member 140 provides a force perpendicular to the longitudinal axis of the SMA wire 15 when the first and second portions 130, 132 are crimped together. As such, the SMA wire 15 is deformed into the recess 136 by the elongate member 140. Due to this configuration, the SMA wire 15 may be held more securely in place by the crimp 128 than if the SMA wire 15 was held in place by two flat pieces of material.

In embodiments, the elongate member 140 may include an additional layer of material 142 on the bottom side 143 (not shown) and/or the top side 144 (shown in FIG. 20C) of the elongate member 140 so that the elongate member 140 extends into the recess 136 and/or the elongate member 140 extends further into the recess 136 than the elongate member 140 otherwise would. Accordingly, a flat crimping tool may be used to crimp the first and second portions 130, 132 together.

FIG. 21 depicts a base layer 60 of a moving member 14, in accordance with the embodiments of the disclosure. As illustrated, the base layer 60 may be substantially planar and include attachment structures 146. In embodiments, two diagonal corners 148 of the plate 60 may include two attachment structures 146. Each attachment structure 146 may include crimps, for example, the crimps 115, 128, depicted in FIGS. 19 and 20A-20C, respectively. Additionally or alternatively, attachment structures 146 of the plate 60 may include one or more recesses, for example, an array of plural recesses, one or more etch patterns and/or an array of partial etch patterns. The one or more recesses included in the attachment structures 146 may hold the SMA wire 15 more securely than if the SMA wire 15 was held in place by two flat pieces of material. One or more of the etching methods described above in relation to FIGS. 8-14 may be used to create the etch patterns. In embodiments, a dielectric and conductive layer may be disposed over the etch patterns. After the etch patterns are made, the corners of the partial etch patterns may be rounded to reduce the likelihood of damaging an SMA wire 15.

FIGS. 22A-24B depict embodiments of partial etch patterns that may be etched into the attachment structures 146. In each of the embodiments shown in FIGS. 22A-24B, an SMA wire 15 secured to the attachment structures 146 may be deformed by the partial etch patterns. As such, an SMA wire 15 may be held more securely in place by the attachment structure 146 than if the SMA wire 15 was held in place by two flat pieces of material.

Figure 22A:
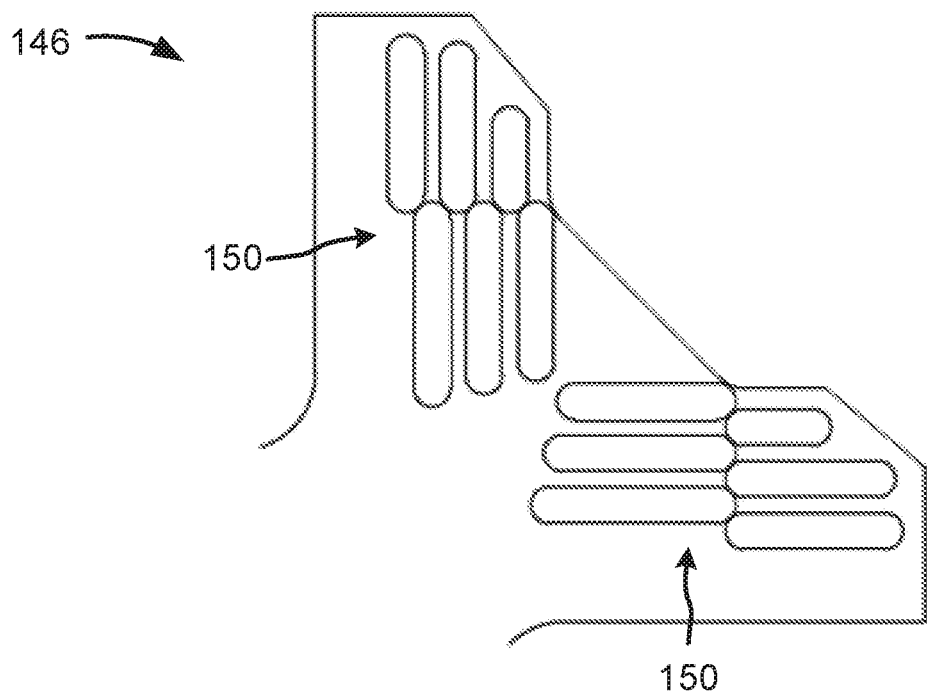
FIGS. 22A-24B illustrate embodiments of partial etch patterns that can be etched into the attachment structures disclosed herein.
Figure 22B:
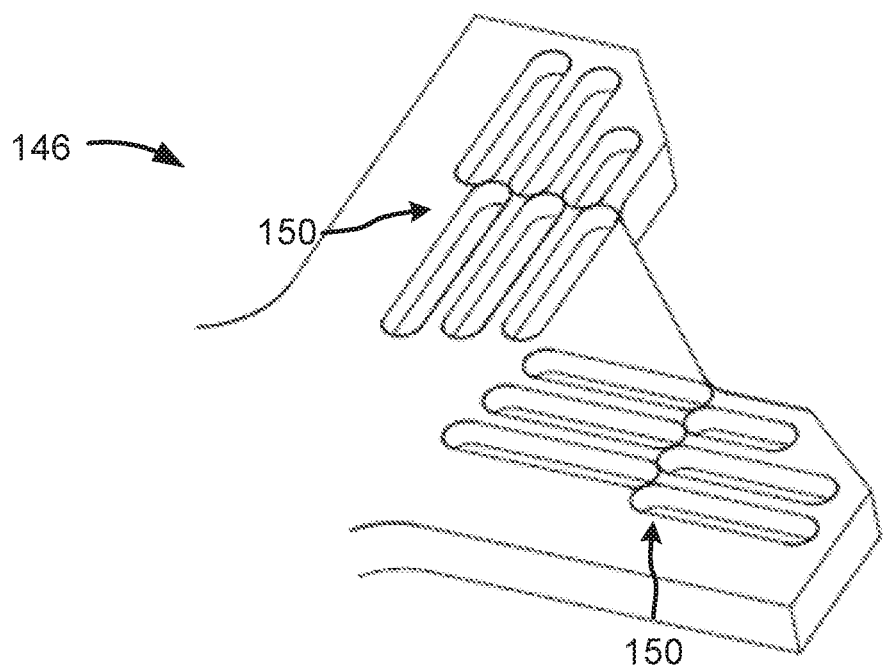
Figure 23A:
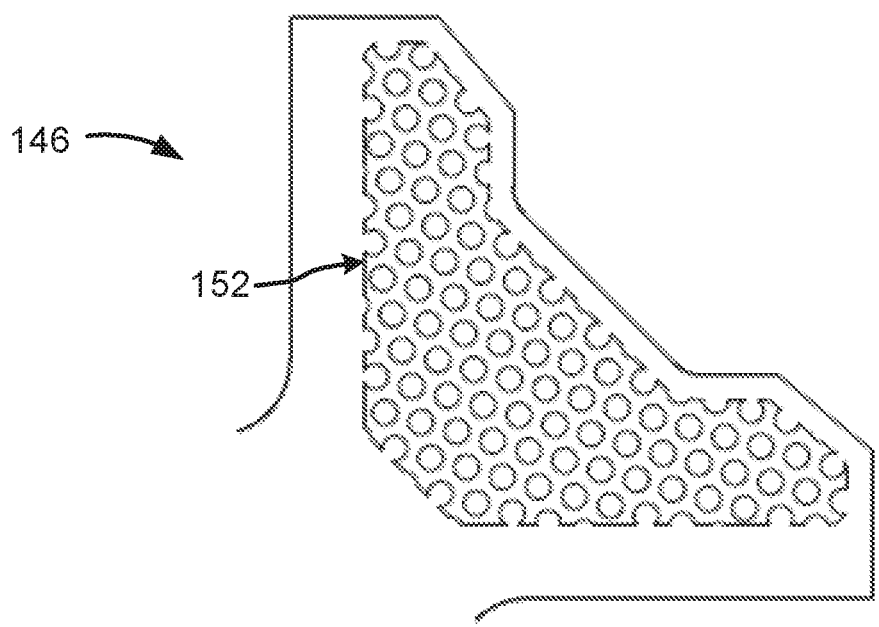
Figure 23B:
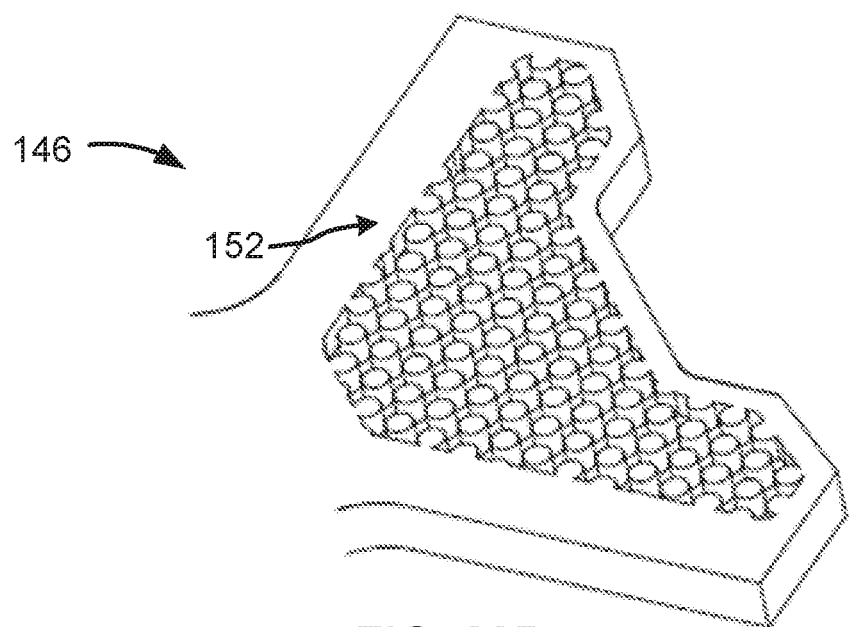
Figure 24A:
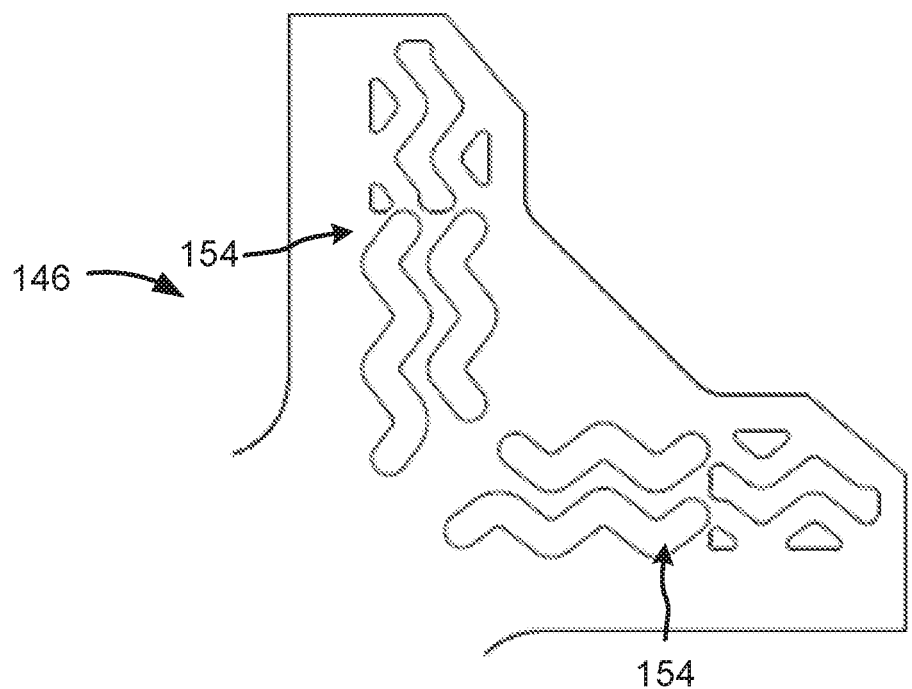
Figure 24B:
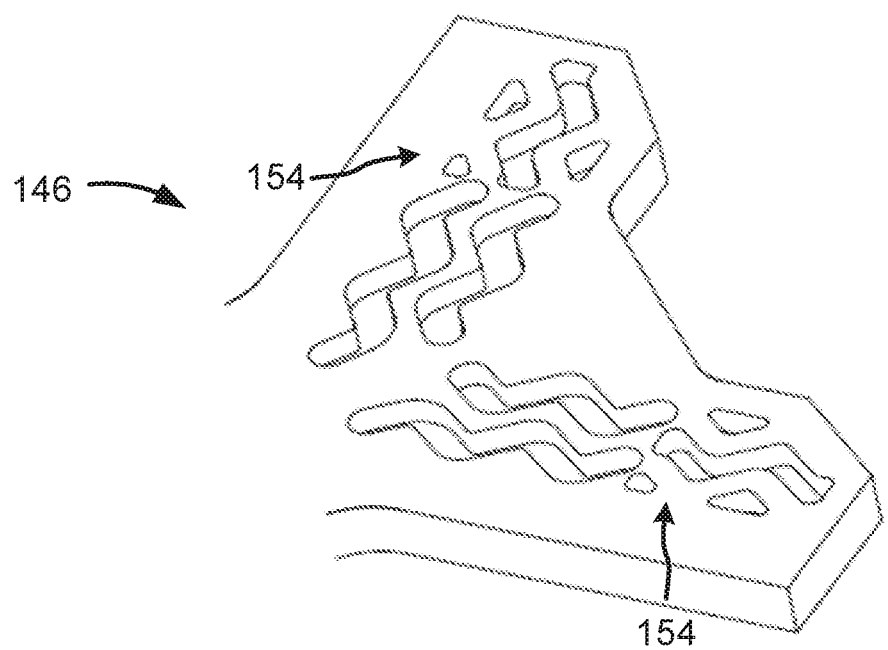

As an example, the partial etch patterns 150 may be staggered linear recesses, as depicted in FIGS. 22A-22B. In embodiments, the partial etch patterns 150 may be offset with respect to each other, for example, in an interwoven, interleaved, staggered and/or the like when the crimps included in the attachment structure 146 is crimped. As another example, the partial etch patterns 152 may be an array of recesses, as depicted in FIGS. 23A-23B. As even another example, the partial etch patterns 154 may be parallel zig-zags, as depicted in FIGS. 24A-24B.

Figure 25A:
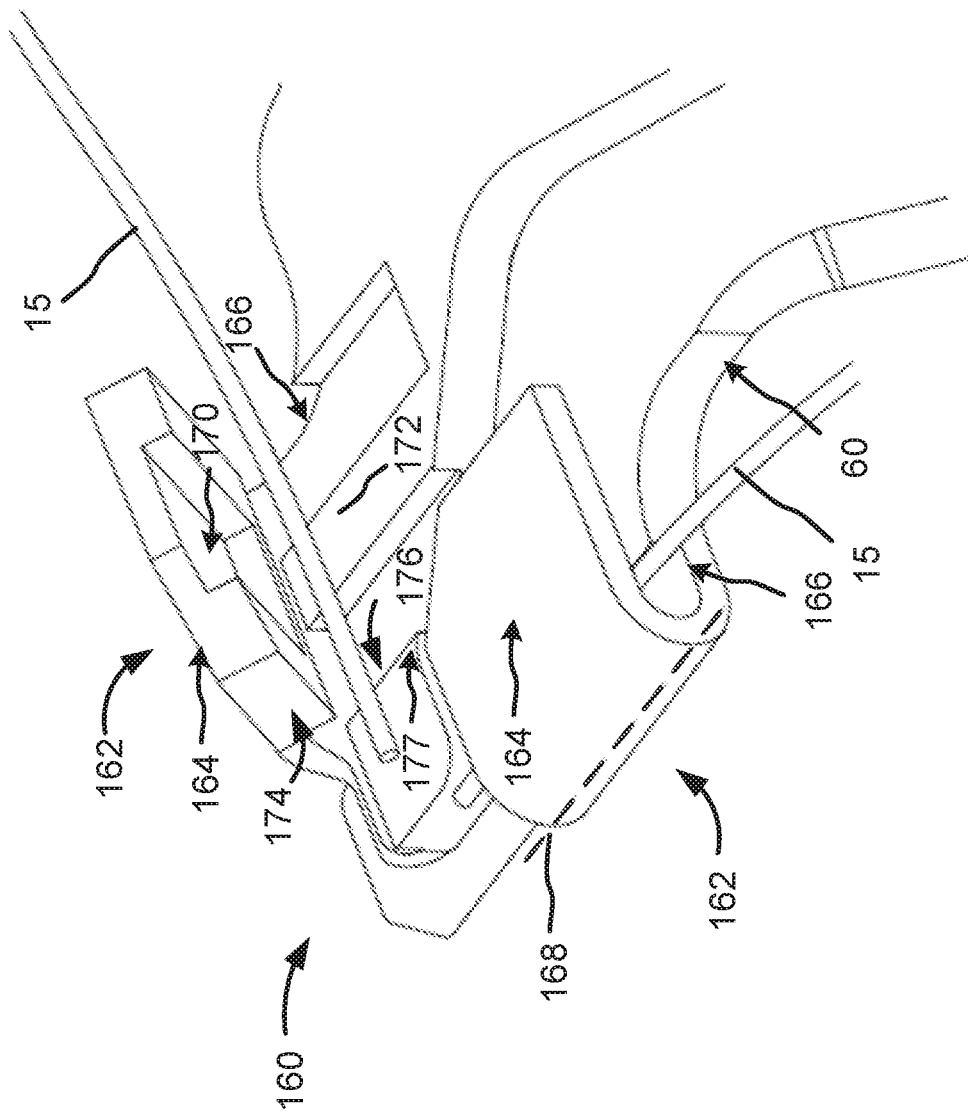
FIGS. 25A-25C illustrate an attachment structure that can be incorporated into the moving member.
Figure 25B:
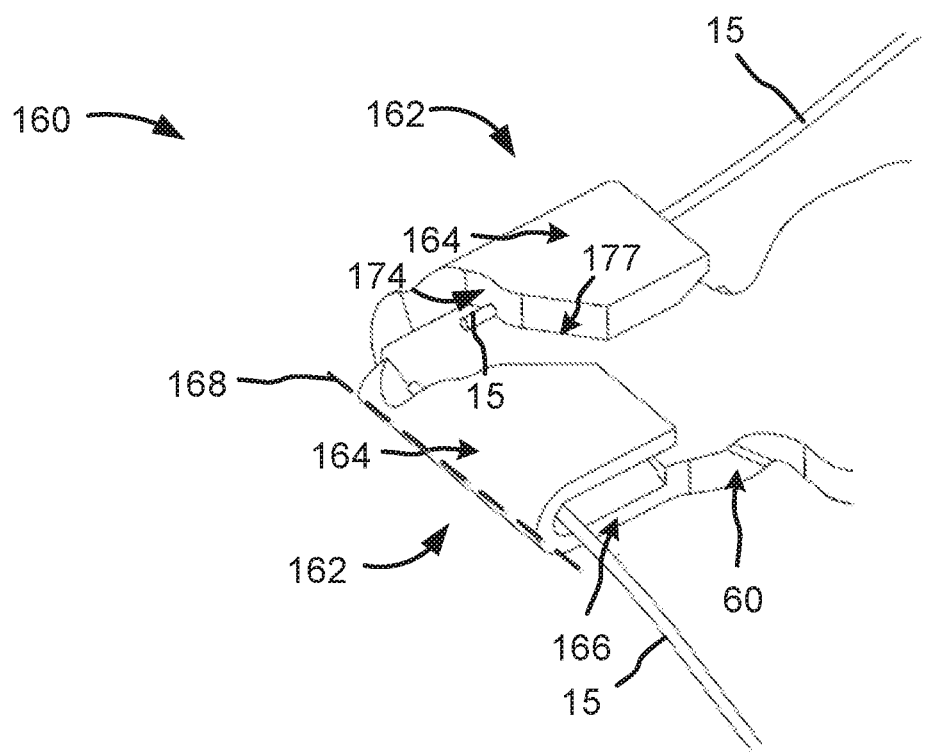
Figure 25C:
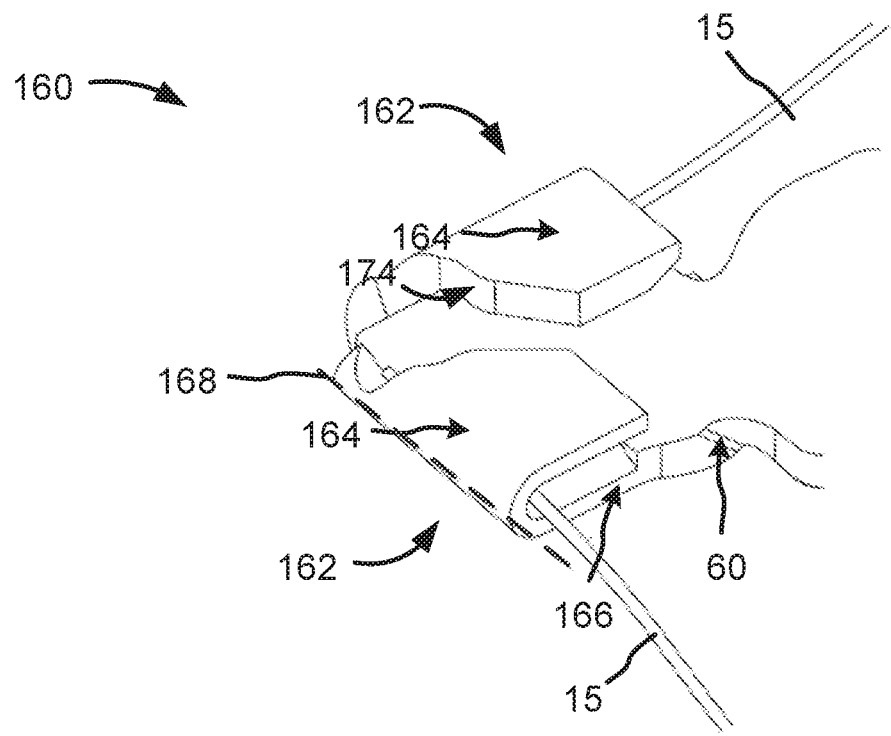

FIGS. 25A-25C illustrate another attachment structure 160 that can be incorporated into the moving member 14, in accordance with embodiments of the disclosure. In embodiments, the features of the attachment structure 160 discussed below may be incorporated in other attachment structures discussed herein. As illustrated, the attachment structure 160 includes two crimps 162. The crimps 162 are unitary with the plate 60 and include first portions 164 and second portions 166. The first portions 164 are configured to be folded substantially along an axis 168 in order to crimp the first and second portions 164, 166 together. When the first and second portions 164, 166 are crimped together, they are capable of holding an SMA wire 15 in place. As illustrated above in FIGS. 1A and 1B, the other ends of the SMA wire 15 is coupled to the support member 12.

As illustrated, the first portions 164 include a recess 170 and the second portions 166 include an elongate member 172. When the first and second portions 164, 166 are crimped together, the elongate member 172 extends into the recess 170. The SMA wire 15 is deformed into the recess 170 by the elongate member 172 when the first and second portions 164, 166 are crimped together. Due to this configuration, the SMA wire 15 may be held more securely by the crimps 162 than if the SMA wire 15 was held in place by two flat pieces of material. In embodiments, the edge 176 may include a portion 177 that extends beyond the edge 174, so that when the first and second portions 164, 166 are crimped together, the first portion 164 fits to the second portion 166, as shown in FIGS. 25B, 25C.

In addition, the first portion 164 includes an edge 174 and the second portion 166 includes an edge 176 that is offset from the edge 174. When the first and second portions 164, 166 are crimped together, the edges 174, 176 are configured to create a cutting edge capable of severing the SMA wire 15. FIG. 25B depicts the attachment structure 160 with both crimps 162 closed and FIG. 25C depicts the attachment structure 160 after the edges 174, 176 severe the end portion of the SMA wire 15.

Figure 26A:
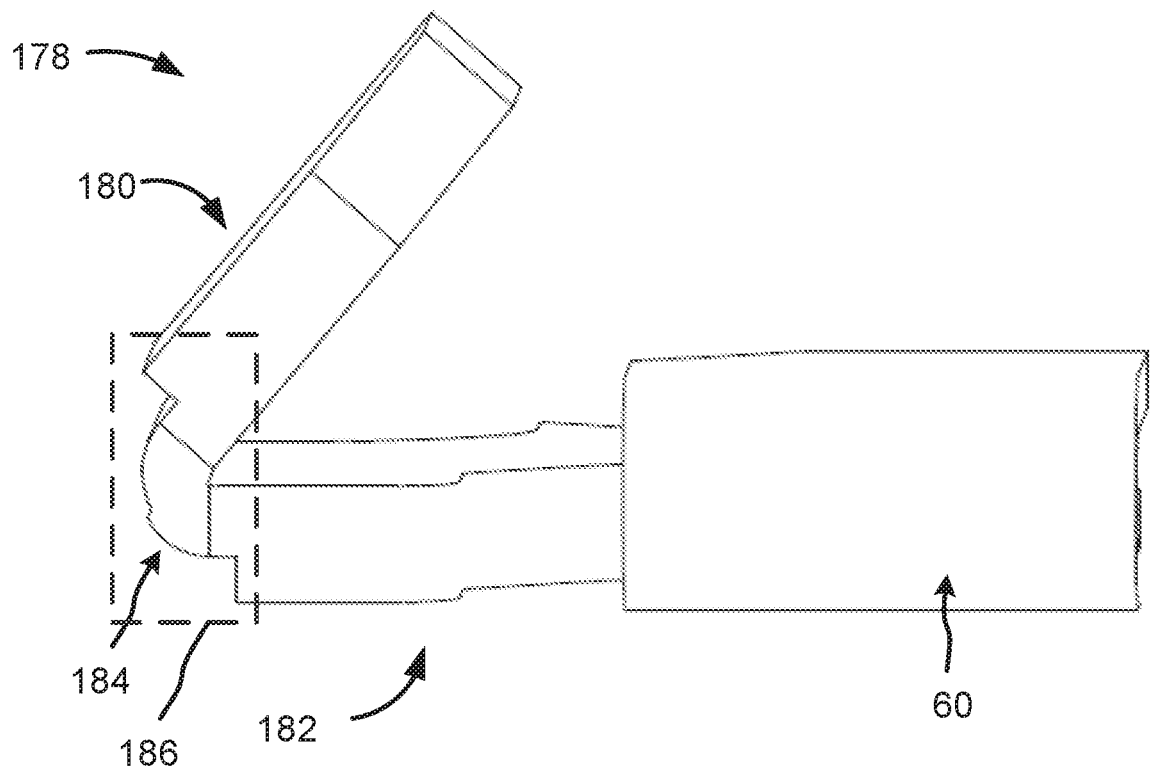
FIGS. 26A-26B illustrate another embodiment of a crimp that can be incorporated into the attachment structures disclosed herein.
Figure 26B:
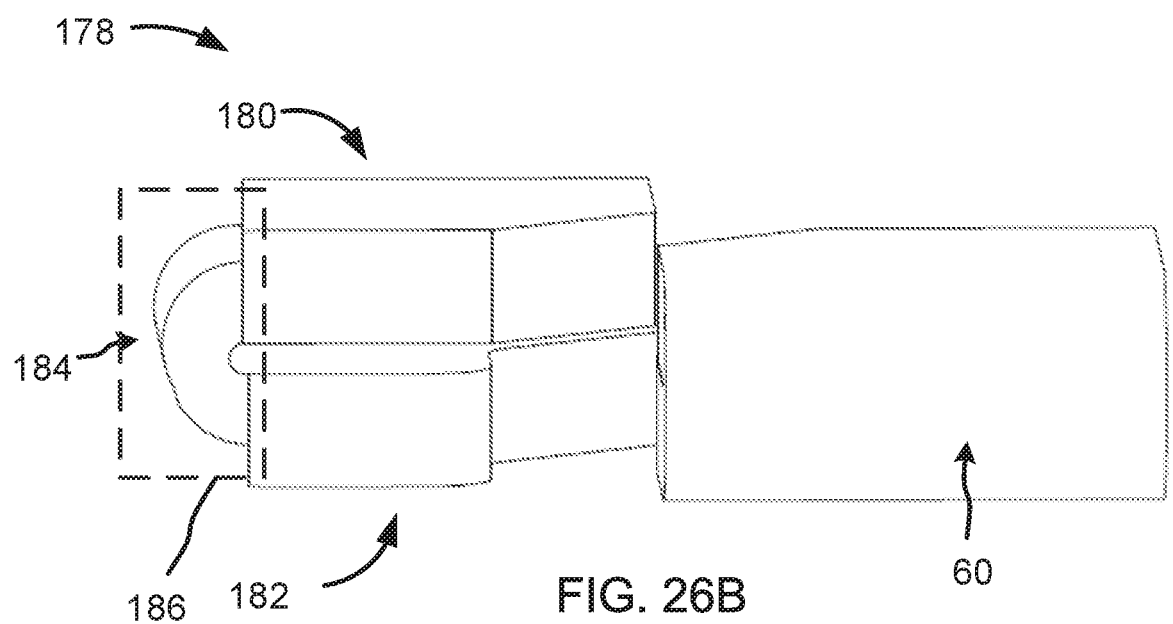

FIGS. 26A-26B illustrate another embodiment of a crimp 178, in accordance with the embodiments of the present disclosure. Similar to the crimps depicted above, the crimp 178 can be incorporated into the moving member 14 and/or the attachment structures depicted above. The crimp 178 is unitary with the plate 60 and includes first and second portions 180, 182 that are configured to be folded together. When the first and second portions 180, 182 are folded together, as illustrated in FIG. 26B, they are capable of crimping an SMA wire 15 in place.

As illustrated, the crimp 178 includes an etched recess 184. The recess 184 is located substantially where the crimp 178 bends 186 when the first and second portions 180, 182 are crimped together. Furthermore, the recess 184 is located on the exterior portion of the bend 186. The recess 184 may lower the stress on the bend 186, which can reduce the likelihood that the plate 60 will crack when the first and second portions 180, 182 are crimped together. In embodiments, this may be advantageous when the plate 60 is made of a thicker metal and/or when the plate 60 is made of a less ductile and/or less malleable metal. In embodiments, the recess 184 may be formed by etching, such as the etching methods described above in relation to FIGS. 8-14.

In embodiments, a similar etched recess as the etched recess 184 may be included in support member 12. That is, for example, an etched recess may located substantially where the crimps 92a, 92b bends when the first portions 94a, 94b and second portions 96a, 96b are crimped together.

Figure 27A:
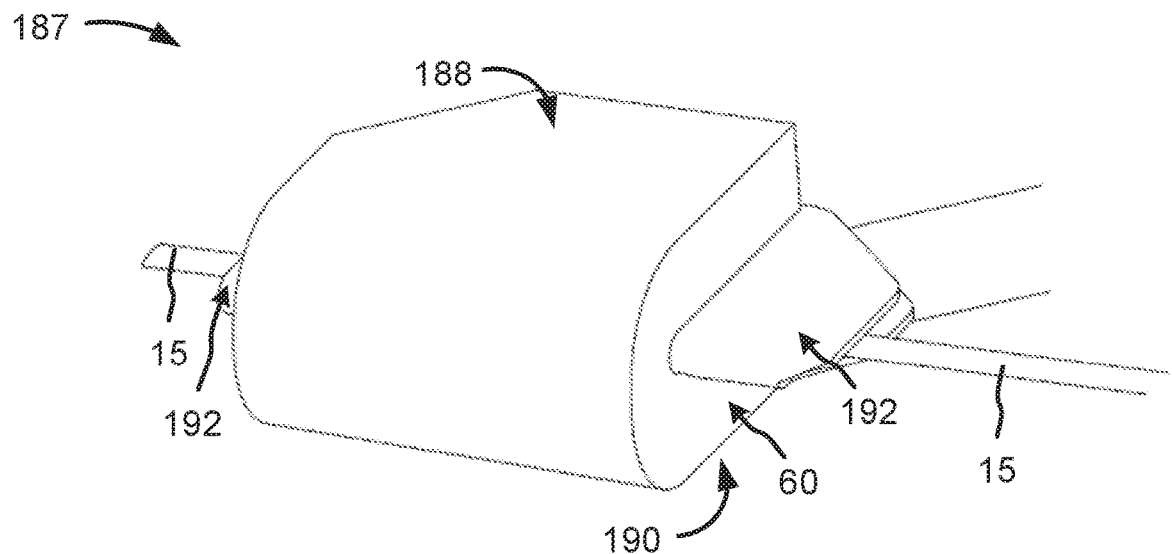
FIGS. 27A-27C illustrate another embodiment of a crimp that can be incorporated into the attachment structures disclosed herein.
Figure 27B:
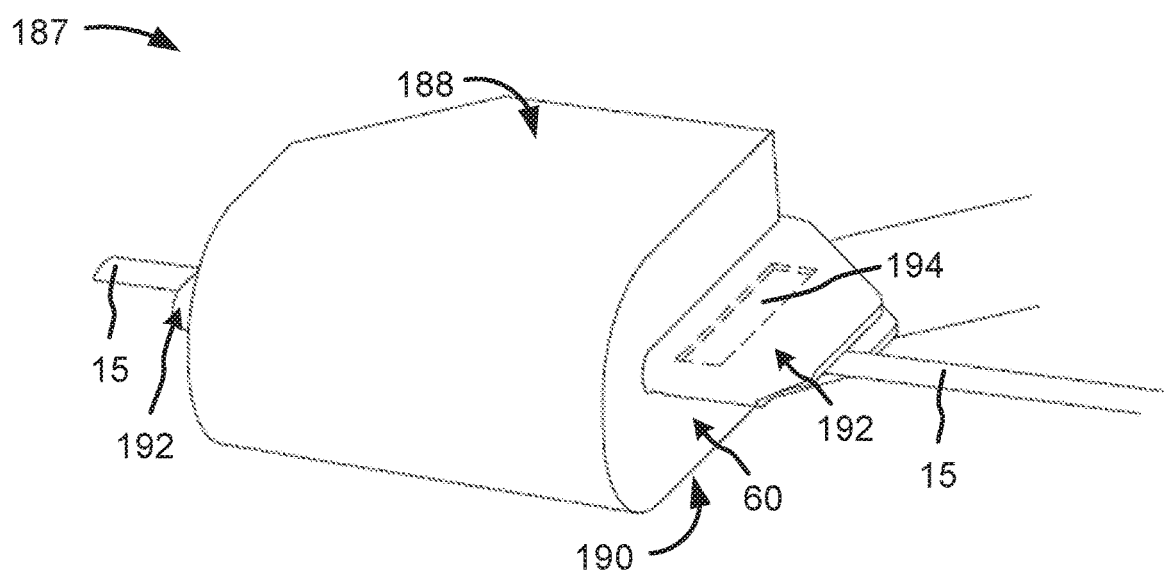
Figure 27C:
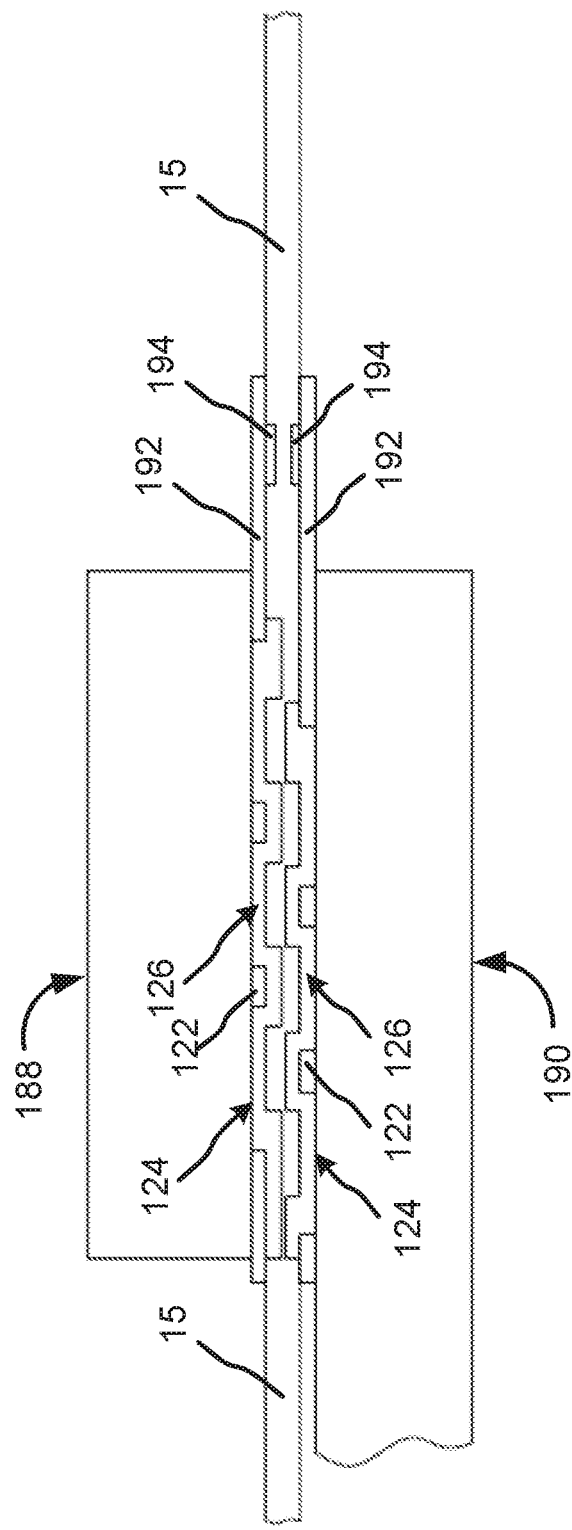

FIGS. 27A-27C illustrate another embodiment of a crimp 187, in accordance with the embodiments of the present disclosure. Similar to the crimps depicted above, the crimp 187 can be incorporated into the support member 12, the moving member 14 and/or the attachment structures depicted above in relation the support and moving members 12, 14, respectively. The crimp 187 is unitary with the plate 60 and includes first and second portions 188, 190 that are configured to be folded together. When the first and second portions 164, 166 are folded together, as illustrated, they are capable of crimping an SMA wire 15 in place.

The crimp 187 includes a strain relief member 192 that extends from at least one side of the crimp 187 and supports and/or provides a crimping force on the SMA wire 15. As illustrated, the strain relief member 192 extends from both sides of the crimp 187; however, in other embodiments, the strain relief member 192 only extends from one side of the crimp 187.

In conventional embodiments, when the suspension assembly 10 is under stress, the SMA wire 15 may be damaged and/or broken proximal to where the SMA wire 15 exits the side of a crimp since where the SMA exits the side of a crimp is an inherent high stress area. The strain relief member 192 decreases the stress on the SMA wire 15 because the strain relief member 192 may bend with the SMA wire 15, thereby increasing the bend radius of the SMA wire 15 when the suspension assembly 10 is under stress. That is, instead of a section of the SMA wire 15 that has, for example, a width x that may bend at an angle θ, the strain relief member 192 may increase the width of the section that bends at the angle θ to, for example, $2*x$, $3*x$, $4*x$, etc. This distributes the stress on the SMA wire 15 over a greater portion of the SMA wire 15. In embodiments, the distance that the strain relief member 192 protrudes from the side of the crimp 187 may vary, depending on, for example, the type, the stiffness and/or the thickness of material used for the SMA wire 15.

In embodiments, the strain relief member 192 may be made of metal. For example, the strain relief member 192 may be made of the same material as the traces 18, such as copper, copper alloys or other conductors. As such, the strain relief member 192 may be coupled to the traces 18. In embodiments, an insulating covercoat can be applied over all or portions of the strain relief layer 192. Corrosion resistant metals such as gold (Au) and/or nickel (Ni) can be plated or otherwise applied to portions of the strain relief layer 192 to provide corrosion resistance. Additionally or alternatively, the strain relief member 192 may be made of a dielectric. For example, the strain relief member 192 may be made of the same material as the dielectric 78. Examples of dielectrics may include a polyimide or other insulating materials. Additionally or alternatively, the strain relief member 192 may include a metal pad 194, as illustrated in FIGS. 27B and 27C, on the interior of the strain relief. In embodiments, the metal pad 194 may help grip the SMA wire 15 and reduce the likelihood that the SMA wire 15 slips out of the strain relief member 192.

Figure 28A:
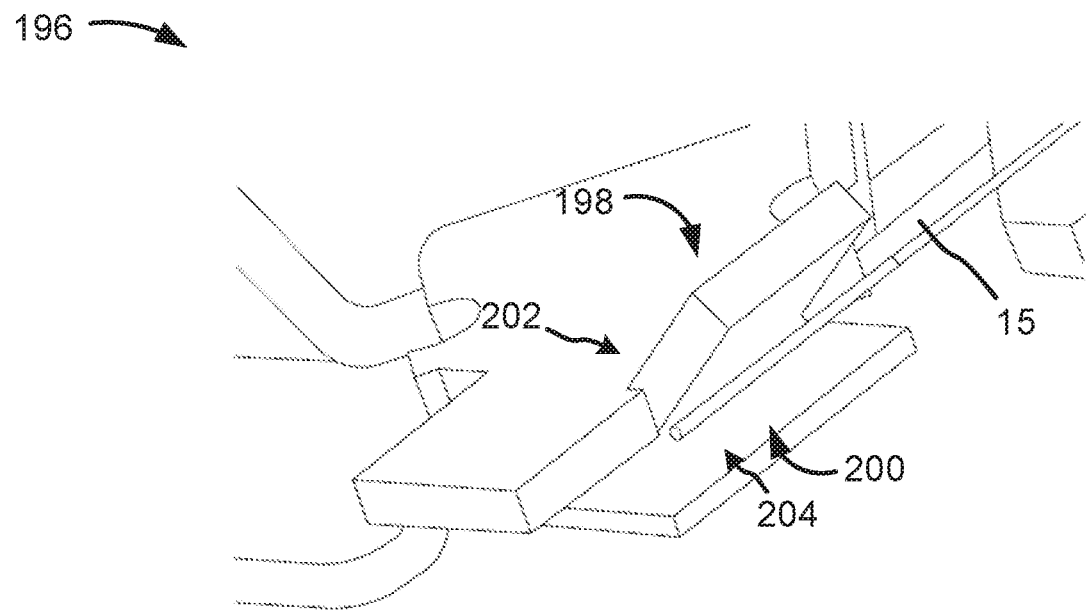
FIGS. 28A-28B illustrate another embodiment of a crimp that can be incorporated into the attachment structure disclosed herein.
Figure 28B:
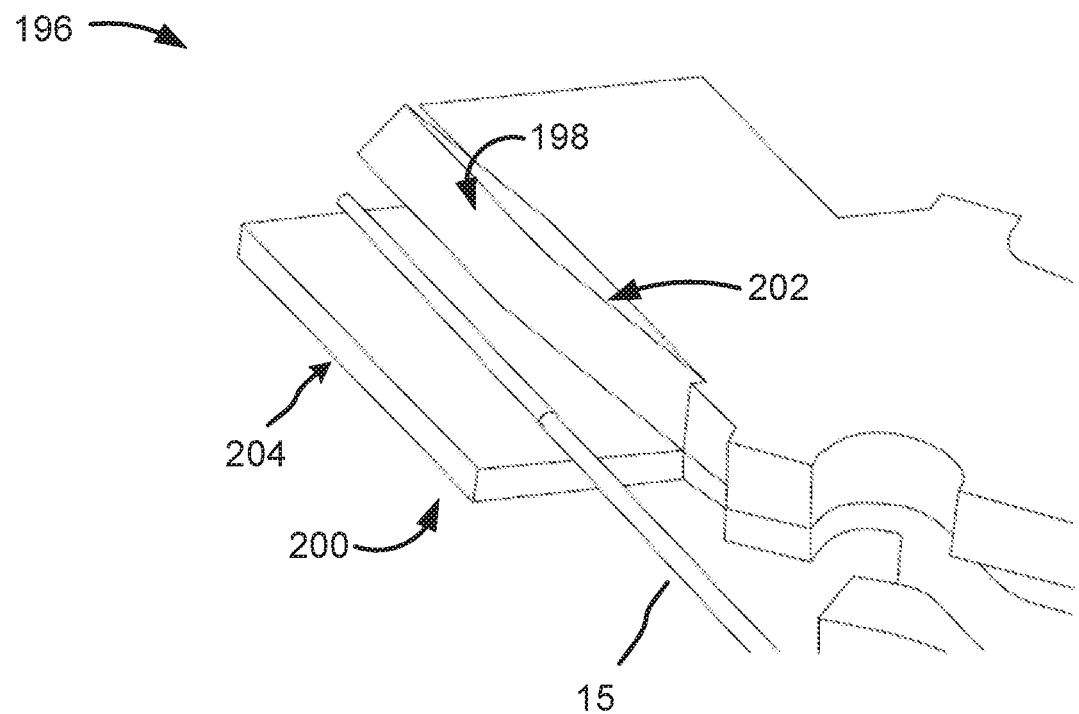

FIGS. 28A-28B illustrate another embodiment of a crimp 196, in accordance with the embodiments of the present disclosure. Similar to the crimps depicted above, the crimp 196 can be incorporated into the support member 12, the moving member 14 and/or the attachment structures depicted above in relation the support and moving members 12, 14, respectively. The crimp 196 includes two portions, a first portion 198 and a second portion 200 that are configured to be folded together. When the first and second portions 198, 200 are folded together, they are capable of crimping an SMA wire 15 in place. One or more of the embodiments described above may be incorporated in the crimp 196 to increase the holding strength of the crimp 196 and/or reduce the strain on the SMA wire 15 when the support member 10 is under stress.

The second portion 200 may be unitary with the plate 60. The first portion 198 is non-unitary with the second portion 200, but may be coupled to the second portion 200 using an adhesive, a weld, a solder joint and/or the like. The first and second portions 198, 200 may be coupled together on either side of the SMA wire 15. That is, in embodiments, the first and second portions 198, 200 may be coupled on the interior side 202 of the crimp 196 or on the exterior side 204 of the crimp.

Figure 29:
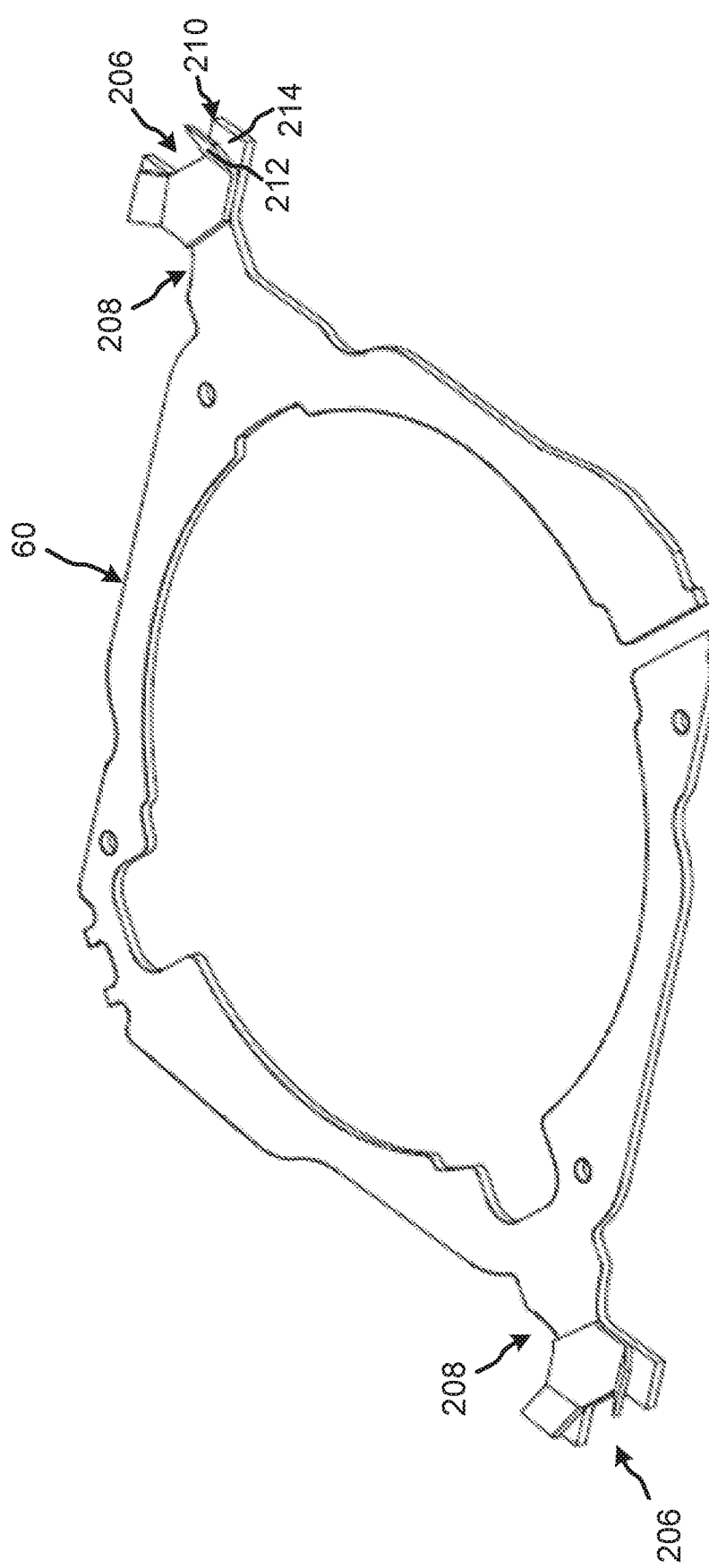
FIG. 29 depicts another base layer of a moving member, in accordance with the embodiments of the disclosure.

FIG. 29 depicts a base layer 60 of a moving member 14, in accordance with the embodiments of the disclosure. As illustrated, the base layer 60 may be substantially planar and include attachment structures 206. In embodiments, two diagonal corners 208 of the plate 60 may include two attachment structures 206. Each attachment structure 206 may include crimps 210, for example, the crimps 196, depicted in FIGS. 28A-28B. For example, the crimps 210 included in the attachment structure 206 may include a first portion 212 that is non-unitary with a second portion 214, but is coupled to the second portion 214 using an adhesive, a weld, a solder joint and/or the like. Additionally or alternatively, attachment structures 206 of the plate 60 may include etch patterns. The etch patterns included in the attachment structures 206 may hold the SMA wire 15 more securely than if the SMA wire 15 was held in place by two flat pieces of material. One or more of the etching methods described above in relation to FIGS. 8-14 may be used to create the etch patterns. In embodiments, a dielectric and conductive layer may be disposed over the etch patterns. After the etch patterns are made, the corners of the partial etch patterns may be rounded to reduce the likelihood of damaging an SMA wire 15.

Although the embodiments of the disclosure have been described with reference to preferred embodiments, those of skill in the art will recognize that changes can be made in form and detail without departing from the spirit and scope of the disclosure. For example, although the illustrated embodiments include the traces on the sides of the flexure arms opposite the support member (i.e., on the top side of the traces), other embodiments can alternatively or in addition include traces on the sides of the flexure arms facing the moving member (i.e., on the bottom side of the traces).

What is claimed is:

1. A suspension assembly, comprising:
a support member configured as a one-piece metal base layer, wherein the one-piece metal base layer includes a plurality of attachment structures, the plurality of attachment structures includes a first attachment structure;
a moving member movably coupled to the support member, the moving member including a plate, wherein the plate includes a second attachment structure, the second attachment structure including:
a first portion including first elongated features being spaced apart by first spaces; and
a second portion configured to be crimped together with the first portion, the second portion including second elongated features being spaced apart by second spaces, and wherein the first spaces substantially align with the second elongated features and the first elongated features substantially align with the second spaces, wherein at least one of the first and second portions includes at least one etched recess pressed in the plate, a dielectric layer is disposed over the at least one etched recess pressed in the plate; and
a shape-memory alloy wire being coupled to the first attachment structure and the first and second portions.

2. The suspension assembly of claim 1, wherein the first and second elongated features are formed from a conductive material.

3. The suspension assembly of claim 1, wherein the first and second elongated features are formed from a dielectric.

4. The suspension assembly of claim 3, further comprising: a first conductive layer disposed on the first elongated features and the first spaces and a second conductive layer disposed on the second elongated features and the second spaces.

5. The suspension assembly of claim 4, wherein the first and second conductive layers are electrically coupled to the plate.

6. The suspension assembly of claim 4, wherein the first and second conductive layers are a continuous conductive layer.

7. The suspension assembly of claim 1, wherein the first portion includes etched recesses that receive the first elongated features and wherein the second portion includes etched recesses that receive the second elongated features.

8. The suspension assembly of claim 7, wherein the etched recesses include rounded edges.

9. The suspension assembly of claim 1, further including a member extended from at least one side of the first and second portions, wherein the shape-memory alloy wire is crimped by the member.

10. The suspension assembly of claim 1, wherein the first and second portions are unitary with the plate.

11. The suspension assembly of claim 10, wherein the plate includes a partial etched recess on an outer portion of a bend in the first and second portions when the first and second portions are crimped together.

12. The suspension assembly of claim 1, wherein first and second portions are non-unitary and are coupled together using at least one of: an adhesive, a weld and a solder joint.

13. The suspension assembly of claim 1, further comprising a shape-alloy wire cutting pad disposed on the plate.

14. A suspension assembly, comprising:
a support member configured as a one-piece metal base layer, wherein the one-piece metal base layer includes a first attachment structure extending from the support member;
a moving member movably coupled to the support member, the moving member including a plate, wherein the plate includes a second attachment structure, the second attachment structure including:
a first portion; and
a second portion configured to be crimped together with the first portion, wherein at least one of the first and second portions includes at least one etched recess pressed in the plate, a dielectric layer is disposed over the at least one etched recess pressed in the plate; and
a shape-memory alloy wire coupled to the first attachment structure and the first and second portions.

15. The suspension assembly of claim 14, wherein both the first and second portions include at least one etched recess.

16. The suspension assembly of claim 14, further comprising: a conductive layer disposed on the first and second portions.

17. The suspension assembly of claim 14, wherein first and second portions are non-unitary and are coupled together using at least one of: an adhesive, a weld and a solder joint.

18. The suspension assembly of claim 14, further including a member extended from at least one side of the first and second portions, wherein the shape-memory alloy wire is crimped by the member.

19. The suspension assembly of claim 14, further comprising a shape-alloy wire cutting pad disposed on the plate.

20. The suspension assembly of claim 14, wherein the etched recess includes an array of plural recesses.

21. The suspension assembly of claim 20, wherein the plural recesses include at least one of the following patterns: an array of recesses, parallel zig-zags, parallel linear recesses.

22. A suspension assembly, comprising:
a support member configured as a one-piece metal base layer, wherein the one-piece metal base layer includes a first attachment structure;
a moving member movably coupled to the support member, the moving member including a plate, wherein the plate includes a second attachment structure, the second attachment structure including:
a first portion including first dielectric features being spaced apart by first spaces;
a second portion configured to be crimped together with the first portion, the second portion includes second dielectric features being spaced apart by second spaces; and
a member extending from at least one side of the first and second portions when the first and second portions are crimped together; and
a shape-memory alloy wire coupled to the first attachment structure, the first and second portions and a mechanical engagement member.

23. The suspension assembly of claim 22, wherein the first and second portions include etched recesses.

24. The suspension assembly of claim 22, wherein the first spaces substantially align with the second dielectric features and the first features substantially align with the second spaces.

25. The suspension assembly of claim 24, wherein the member extending from at least one side of the first and second dielectric portions is unitary with at least one of the first or second dielectric features.

26. The suspension assembly of claim 24, further comprising: a first conductive layer disposed on the first dielectric features and the first spaces and a second conductive layer disposed on the second dielectric features and the second spaces.

27. The suspension assembly of claim 26, wherein the first and second conductive layers are electrically coupled to the plate.

28. The suspension assembly of claim 26, wherein the first and second conductive layers is a continuous conductive layer.

29. The suspension assembly of claim 24, wherein the first portion includes etched recesses that receive the first members and wherein the second portion includes etched recesses that receive the second members.

30. The suspension assembly of claim 23, wherein the etched recesses include rounded edges.

31. The suspension assembly of claim 22, wherein first and second portions are non-unitary and are coupled together using at least one of: an adhesive, a weld and a solder joint.

32. A suspension assembly, comprising:
a support member configured as a one-piece metal base layer, wherein the one-piece metal base layer includes a plurality of attachment structures, the plurality of attachment structures includes a first attachment structure extending from the support member;
a moving member movably coupled to the support member, the moving member including:
a plate including a first portion, the first portion including first dielectric features being spaced apart by first spaces; and
a second portion configured to be crimped together with the first portion, the second portion including second dielectric features being spaced apart by second spaces, wherein the second portion is non-unitary with the first portion and coupled to the first portion using at least one of: an adhesive, a weld and a solder joint; and
a shape-memory alloy wire coupled to the first attachment structure and the first portion and second portions.

33. The suspension assembly of claim 32, wherein the first and second portions include etched recesses.

34. The suspension assembly of claim 32, wherein the first spaces substantially align with the second dielectric features and the first dielectric features substantially align with the second spaces.

35. The suspension assembly of claim 34, further comprising: a first conductive layer disposed on the first dielectric features and the first spaces and a second conductive layer disposed on the second dielectric features and the second spaces.

36. The suspension assembly of claim 35, wherein the first and second conductive layers are electrically coupled to the plate.

37. The suspension assembly of claim 35, wherein the first and second conductive layers is a continuous conductive layer.

38. The suspension assembly of claim 34, wherein the first portion includes etched recesses that receive the first dielectric features and wherein the second portion includes etched recesses that receive the second dielectric features.

39. The suspension assembly of claim 33, wherein the etched recesses include rounded edges.

40. A suspension assembly, comprising:
a support member configured as a one-piece metal base layer including a plurality of attachment structures;
at least a first attachment structure of the plurality of attachment structures affixed to the one-piece metal base layer and configured to extend from the support member;
a moving member movably coupled to the support member, the moving member including a plate; and
a second attachment structure affixed to the plate, the second attachment structure comprising:
a first portion including first elongated features being spaced apart by first spaces; and
a second portion configured to be crimped together with the first portion, the second portion including second elongated features being spaced apart by second spaces, wherein the first spaces substantially align with the second elongated features and the first elongated features substantially align with the second spaces, wherein any of the first portion and the second portion includes at least one etched recess pressed in the plate, and a dielectric layer is disposed over the at least one etched recess pressed in the plate.

41. The suspension assembly of claim 40, wherein the second portion is non-unitary with the first portion and coupled to the first portion using at least one of: an adhesive, a weld and a solder joint, and the second portion including second elongated features being spaced apart by second spaces, the first spaces substantially align with the second elongated features and the first elongated features substantially align with the second spaces; and a shape-memory alloy wire coupled to the first attachment structure and the first portion and second portions.

42. The suspension assembly of claim 41, wherein the first and second elongated features are formed from a conductive material.

43. The suspension assembly of claim 41, wherein the first and second elongated features are formed from a dielectric.

44. The suspension assembly of claim 42, further comprising: a first conductive layer disposed on the first elongated features and the first spaces and a second conductive layer disposed on the second elongated features and the second spaces.

45. The suspension assembly of claim 44, wherein the first and second conductive layers are electrically coupled to the plate.

46. The suspension assembly of claim 44, wherein the first and second conductive layers is a continuous conductive layer.

47. The suspension assembly of claim 41, wherein the first portion includes etched recesses that receive the first elongated features and wherein the second portion includes etched recesses that receive the second elongated features.

48. The suspension assembly of claim 47, wherein the etched recesses include rounded edges.

49. The suspension assembly of claim 41, further including a member extended from at least one side of the first and second portions, wherein the shape-memory alloy wire is crimped by the member.

50. The suspension assembly of claim 41, wherein the first and second portions are unitary with the plate.

51. The suspension assembly of claim 40, wherein the first attachment structure is a separate structure from the base layer.

52. The suspension assembly of claim 51, wherein the first attachment structure is attached to the base layer using at least one of: an adhesive, a weld and a solder joint.

53. The suspension assembly of claim 40, wherein the second attachment structure is a separate structure from the plate.

54. The suspension assembly of claim 53, wherein the second attachment structure is attached to the base layer using at least one of: an adhesive, a weld and a solder joint.

55. A suspension assembly, comprising:
a support member including a metal base layer;
a first attachment structure, the first attachment structure configured to attached to the support member, the first attachment structure including:
a first portion, and
a second portion configured to be crimped together with the first portion; and
a moving member movably coupled to the support member, the moving member including a plate, wherein the first portion of the first attachment includes first conductive traces spaced apart by first spaces and a dielectric disposed between the metal base layer and the first conductive traces, and the second portion of the first attachment includes second conductive traces spaced apart by second spaces and a dielectric disposed between the metal base layer and the second conductive traces, the first spaces are substantially aligned with the second conductive traces and the first conductive traces are substantially aligned with the second spaces.

56. The suspension assembly of claim 55, comprising:
a second attachment structure, the second attachment structure configured to attach to the moving member, the second attachment structure including:
a first portion, and
a second portion configured to be crimped together with the first portion.

57. The suspension assembly of claim 56, wherein the first portion of the second attachment includes first elongate features spaced apart by first spaces, and the second portion of the second attachment includes second elongate features spaced apart by second spaces, the first spaces are substantially align with the second elongate features and the first elongate features are substantially align with the second spaces.

58. The suspension assembly of claim 56, wherein the metal base layer is a unitary metal base.

59. The suspension assembly of claim 56, wherein the first attachment structure is attached to the support member using at least one of: an adhesive, a weld and a solder joint and the second attachment structure is attached to the moving member using at least one of: an adhesive, a weld and a solder joint.

60. The suspension assembly of claim 57, wherein the first and second elongate features are formed from a conductive material.

61. The suspension assembly of claim 57, wherein the first and second elongate features are formed from a dielectric.

62. The suspension assembly of claim 57, further comprising: a first conductive layer disposed on the first elongate features and the first spaces and a second conductive layer disposed on the second elongate features and the second spaces.

63. The suspension assembly of claim 57, wherein the first portion includes etched recesses that receive the first elongate features and wherein the second portion includes etched recesses that receive the second elongate features.

64. A suspension assembly, comprising:
   a support member including a metal base layer;
   a first attachment structure, the first attachment structure configured to attached to the support member, the first attachment structure including:
      a first portion including first conductive traces spaced apart by first spaces and a dielectric between the metal base layer and the first conductive traces, and
      a second portion configured to be crimped together with the first portion, the second portion including second conductive traces spaced apart by second spaces and a dielectric between the metal base layer and the second conductive traces, wherein the first spaces substantially align with the second conductive traces and the first conductive traces substantially align with the second spaces; and
   a moving member movably coupled to the support member, the moving member including a plate.

65. The suspension assembly of claim 64, wherein the comprising:
   a second attachment structure, the second attachment structure configured to attach to the moving member, the second attachment structure including:
      a first portion including first elongate features spaced apart by first spaces, and
      a second portion configured to be crimped together with the first portion, the second portion including second elongate features spaced apart by second spaces, wherein the first spaces substantially align with the second elongate features and the first elongate features substantially align with the second spaces.

66. The suspension assembly of claim 64, wherein the metal base layer is a unitary metal base.

67. The suspension assembly of claim 64, wherein the metal base layer includes a partial etched recess on an outer portion of a bend in the first and second portions when the first and second portions are crimped together.

68. The suspension assembly of claim 64, wherein the attachment structure is attached using at least one of: an adhesive, a weld and a solder joint.

69. The suspension assembly of claim 64, further comprising a member extending from at least one side of the first and second portions when the first and second portions are crimped together.

70. The suspension assembly of claim 69, wherein the member is unitary with the dielectric.

71. The suspension assembly of claim 65, wherein each of the first and second elongate features are formed from a conductive material.

72. The suspension assembly of claim 65, wherein each of the first and second elongate features are formed from a dielectric.

73. The suspension assembly of claim 65, further comprising: a first conductive layer disposed on the first elongate features and the first spaces and a second conductive layer disposed on the second elongate features and the second spaces.

74. The suspension assembly of claim 73, wherein the first and second conductive layers are electrically coupled with at least one of the metal base layer and the plate.

75. The suspension assembly of claim 74, wherein the first and second conductive layers is a continuous conductive layer.

76. The suspension assembly of claim 65, wherein the first portion includes etched recesses that receive the first elongate features and wherein the second portion includes etched recesses that receive the second elongate features.

77. The suspension assembly of claim 76, wherein the etched recesses include rounded edges.

* * * * *